US008218627B2

(12) United States Patent
Lee

(10) Patent No.: US 8,218,627 B2
(45) Date of Patent: Jul. 10, 2012

(54) SCALABLE MPEG VIDEO/MACRO BLOCK RATE CONTROL

(75) Inventor: Hung-Ju Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 20 days.

(21) Appl. No.: 12/713,084

(22) Filed: Feb. 25, 2010

(65) Prior Publication Data

US 2010/0150228 A1 Jun. 17, 2010

Related U.S. Application Data

(60) Division of application No. 10/996,139, filed on Nov. 19, 2004, now Pat. No. 7,697,608, which is a continuation-in-part of application No. 10/943,551, filed on Sep. 17, 2004, now abandoned.

(60) Provisional application No. 60/554,533, filed on Mar. 18, 2004, provisional application No. 60/541,340, filed on Feb. 3, 2004.

(51) Int. Cl.
*H04B 1/66* (2006.01)

(52) U.S. Cl. ......... 375/240.03; 375/240.05; 375/240.07; 375/240.12; 382/236; 382/251; 382/238; 382/239

(58) Field of Classification Search ............. 375/240.03, 375/240.05, 240.07, 240.12; 382/236, 251, 382/238, 239

See application file for complete search history.

(56) References Cited

U.S. PATENT DOCUMENTS

| 5,623,312 A | 4/1997 | Yan et al. |
| 5,629,736 A | 5/1997 | Haskell et al. |
| 5,687,095 A | 11/1997 | Haskell et al. |
| 5,838,828 A * | 11/1998 | Mizuki et al. ................. 382/236 |
| 6,011,589 A | 1/2000 | Matsuura et al. |
| 6,044,115 A | 3/2000 | Horiike et al. |
| 6,091,774 A | 7/2000 | Hyodo et al. |
| 6,141,380 A | 10/2000 | Krishnamurthy et al. |
| 6,167,084 A | 12/2000 | Wang et al. |
| 6,233,355 B1 | 5/2001 | Kajiwara |
| 6,351,491 B1 | 2/2002 | Lee et al. |
| 6,366,705 B1 * | 4/2002 | Chiu et al. .................... 382/239 |
| 6,483,928 B1 | 11/2002 | Bagni et al. |
| 6,504,494 B1 | 1/2003 | Dyas et al. |
| 6,507,616 B1 | 1/2003 | Ryu |
| 6,600,836 B1 * | 7/2003 | Thyagarajan et al. ........ 382/239 |
| 6,650,787 B1 | 11/2003 | Takahashi et al. |
| 6,687,301 B2 | 2/2004 | Moschetti |
| 6,891,889 B2 | 5/2005 | Kim et al. |
| 7,046,729 B2 * | 5/2006 | Yu et al. .................... 375/240.12 |

(Continued)

FOREIGN PATENT DOCUMENTS

JP 10224786 A 8/1998

(Continued)

*Primary Examiner* — Shawn An
(74) *Attorney, Agent, or Firm* — John P. O'Banion

(57) ABSTRACT

A scaleable macro block rate control method particularly well-suited for MPEG video. There is provided a method to easily derive a quantization parameter (QP) value using information such as bit usage, previous QP values and SAD values from the past encoded and future frames. The method utilizes quantization estimation techniques based on statistical relationships between different intensity measures, such as distortion intensity, absolute difference intensity and mean of absolute difference intensity. The method is well-suited to applications utilizing MPEG video such as MPEG-1, MPEG-2, MPEG-4, JVT/H.264 standards and so forth.

14 Claims, 7 Drawing Sheets

U.S. PATENT DOCUMENTS

| | | | |
|---|---|---|---|
| 7,133,448 B2 | 11/2006 | Chang et al. | |
| 7,280,597 B2 | 10/2007 | Zhang et al. | |
| 7,559,078 B2 * | 7/2009 | Zhang et al. | 725/95 |
| 7,697,608 B2 * | 4/2010 | Lee | 375/240.03 |
| 7,940,843 B1 * | 5/2011 | Nie et al. | 375/240.02 |
| 2002/0012395 A1 | 1/2002 | Song et al. | |
| 2002/0122482 A1 | 9/2002 | Kim et al. | |
| 2003/0053454 A1 | 3/2003 | Katsavounidis et al. | |
| 2003/0053537 A1 | 3/2003 | Kim et al. | |
| 2003/0156646 A1 | 8/2003 | Hsu et al. | |
| 2004/0042548 A1 | 3/2004 | Yu et al. | |

FOREIGN PATENT DOCUMENTS

| | | |
|---|---|---|
| JP | 11196424 A | 7/1999 |

* cited by examiner

SCALABLE MPEG VIDEO/MACRO BLOCK RATE CONTROL

CROSS-REFERENCE TO RELATED APPLICATIONS

This application is a divisional of application Ser. No. 10/996,139, filed on Nov. 19, 2004, now U.S. Pat. No. 7,697,608, incorporated herein by reference in its entirety, which is a continuation-in-part of application Ser. No. 10/943,551 filed on Sep. 17, 2004 now abandoned, incorporated herein by reference in its entirety, which claims priority from U.S. provisional application Ser. No. 60/554,533 filed on Mar. 18, 2004, incorporated herein by reference in its entirety, and from U.S. provisional application Ser. No. 60/541,340 filed on Feb. 3, 2004, incorporated herein by reference in its entirety. Priority is claimed to each of the foregoing applications.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding and decoding techniques, and more particularly to methods for scalable macro block layer rate control and picture layer rate control for MPEG video.

2. Description of Related Art

In real video applications, where either a real-time streaming mode or a non-real-time batch mode is used, constant video quality is a goal in developing a rate control scheme. Although the first order and the second order rate distortion models for these two modes provide a good foundation for target bit rate estimation and quantization parameter (QP) estimation, the fluctuation in target bit rate and quantization parameter values derived from the model generates unstable video quality, resulting in worse viewing quality.

Therefore, a need exists for a scalable rate control method that is simple to implement and that results in better viewing quality. The present invention provides these benefits and overcomes the drawbacks of prior methods.

BRIEF SUMMARY OF THE INVENTION

Video coding and decoding techniques are described for scalable macro block (MB) layer rate control and picture layer rate control for MPEG video, including but not limited to, MPEG-1, MPEG-2, MPEG-4 and JVT/H.264 standards. According to an aspect of the invention, there is provided a method to easily derive a quantization parameter (QP) estimation value using information such as bit usage, previous QP values and sum of absolute difference (SAD) values from both past encoded and future frames. In one embodiment, the method comprises the steps of calculating the average bit count (AvgTargetBitP) obtained in a "bit allocation" module (using future frames); calculating the previous bit count (ActualBitPrv)) (using past encoded frame); calculating the target quantizer scale (Qscale) using AvgTargetBit and ActualBitPry to adjust the deficit/surplus bit rate budget; refining Qscale using SAD statistics from past encoded frames and current buffer status; and bounding Qscale in the range of pre-defined MinQP and MaxQP values.

Another aspect of the invention is to provide for scalable macroblock rate control for quality improvement based on picture contents and coding complexity. In one embodiment, the method comprises the steps of initialization wherein, for example, data members can be initialized, image dimension information can be set, and working memory can be allocated; performing an iRateCtrlMbBootUp step which can comprise obtaining the picture level target QP from picture level rate control, calculating each MB content complexity (MbMad) and average Mad, determining the intensity base, and determining the local adjust range; performing a Mode Decision step which comprises calculating InterAD and IntraAD, and possibly determining the final mode and its QP; performing a iRateCtrlMbCalcComplexityIonly step which comprises obtaining InfraAd from mode decision module, calculating the MB-level QP in I-slice, sending this QP back to mode decision module; performing a iRateCtrlMbCalcQp step which comprises obtaining InfraAd and InterAd from the mode decision module, calculating two MB-level QPs, IntraQp and InterQp, for Inter mode and Intra mode, respectively in P-slice, and sending the two QPs to the mode decision module; performing an iecMbCoding step which comprises encoding the current MB; performing a vRateCtrlMbUpdate step which comprises accumulating QP, Ad and the number of coded MBs, checking mode coding where if there is no mode MB coding, returning to the mode decision module or otherwise proceeding to the next step; and performing a vRateCtrlMbAfter step which comprises calculating the distortion of the current frame, calculating the average Ad for the next frame, and calculate the average LocalAdj for the next frame.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the described methods and techniques. It will be appreciated that the invention may vary as to the specific steps and sequence, without departing from the basic concepts as disclosed herein.

A. Scalable Rate Control for MPEG Video

The following discussion illustrates an example embodiment of the present invention. It will be appreciated that labels, terms, sequences and other specific parameters are used in connection with the example described herein and may be changed without departing from the scope of the invention.

1. Bit Rate Control Methodology

Figure 1:
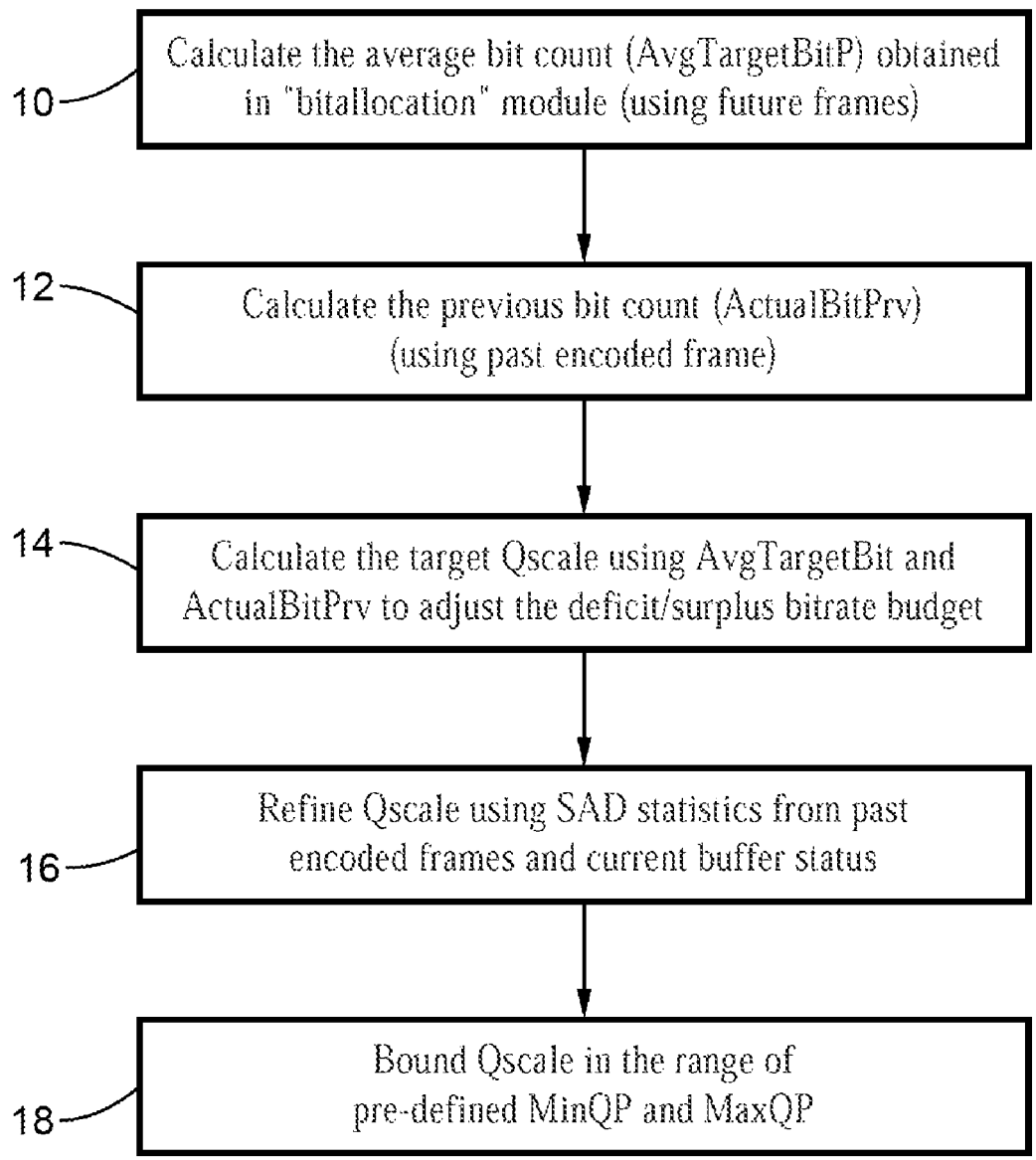
FIG. 1 is flow diagram of an embodiment of a method for scalable rate control of MPEG video according to an embodiment of the present invention.

One aspect of the invention pertains to easily deriving a QP value using information such as bit usage, previous QP values and SAD values from the past encoded and future frames. Referring to FIG. 1, in one embodiment, this is accomplished by carrying out the following steps:

At step 10, the average bit count (AvgTargetBitP) obtained in a "bit allocation" module is calculated using future frames. Next, at step 12, the previous bit count (ActualBitPrv)) is calculated using a past encoded frame. At step 14, the target Qscale is calculated using AvgTargetBit and ActualBitPry to adjust the deficit/surplus bit rate budget. Next, at step 16, Qscale is refined using SAD statistics from past encoded frames and current buffer status. Finally, at step 18, Qscale is bounded in the range of pre-defined MinQp and MaxQp. Elements of this process are described below.

2. Execution Phase 0: Initialization

In this phase, initialization takes place, including the initial buffer status, buffer convergence factor, data arrays for collecting statistics, and specifying the minimum Qscale, Rate-Control sliding window.

2.1 Minimum Qscale Value Setting

The Minimum QP setting is for maintaining maximum video quality for encoding a video sequence. The Qscale value is dependent on the bit rate and frame rate. In the invention, bits per MB are used as a threshold to determine the minimum Qscale, as shown in Table 1.

3. Execution Phase 1: Pre-Encoding

In this phase, the encoder performs the following functions:

(a) Bit rate budget adjustment;
(b) Target bit rate estimation for the current frame;
(c) Qscale calculation for the first I-VOP and subsequent I-VOPs; and
(d) Qscale calculation for P-VOPs.

3.1 Bit Rate Budget Adjustment

Bit allocation is performed based on the SAD values of P-VOP, B-VOP and MAD values of I-VOP. In bit allocation the first step is to calculate the total available bit budget in a Rate Control (RC) window and bit budget for a frame before encoding a frame. To monitor these two values, a sliding window based bit allocation is used, for example as follows:

//total number of bits available for this RC sliding
window TotalBudget=(Default$GovSec$*Bit
rate*RC_SPAN+TotalLoan), Wherein TotalLoan=(CurrentOccupancy−InitialOccupancy) is the amount of under-spending (TotalLoan>0) or overspending the bit budget (TotalLoan<0).

3.2 Target Bit Rate Estimation

Next, the bit allocation for a frame is determined by its frame type and the associated SAD/MAD. First, for each picture type, all of its associated SAD/MAD values are summed, and basically the bit budget for a frame with P-type or B-type is proportional to its MAD with respect to the overall MAD within a RC sliding window. To maintain a minimum quality, an average bit budget for a frame is calculated, and the MAD variation of a frame contributed to the bit budget is bounded, such as by minus and plus 15% as follows:

$Avg$=MAD=TotalMAD/$Num\_ofP\_Vops$ $AvgTargetBitP$=(TotalBudget/((m_$d$RCWindowSize+
3.7)*RC_SPAN))

Variation=limit(−0.15,(TargetMAD$t$−$Avg$MAD)/$Avg$-
MAD,0.15)

TargetBits=($int$)($Avg$TargetBit$P$*(1.0+$d$Variation))

After this bit allocation, the buffer fullness is taken into account by adjusting the target bits toward the initial buffer occupancy as follows:

Cushion=(PseudoBufferSizeTop−Occupancy)

Fullness=(Occupancy−PseudoBufferSizeBottom)

TargetBits=(TargetBit$Cur$*(Cushion+
ConvergeFactor*Fullness)/
(ConvergeFactor*Cushion+Fullness))

3.3 QP Value for the First I-VOP

In a real application, the video quality of the first VOP plays an important role in determining the first impression of a user viewing a decompressed video sequence. Unlike MPEG-4 committee code which requires input for the first I, P and B VOPs, according to the rate control scheme of the present invention, a simple but effective assumption is made to provide a reasonable video quality of the first frame without user interaction. The QP value is determined based on the following assumption: For example, if the DefaultCompressionRatio is equal to 10:1, then DefaultQScale is reasonably equal to 5 so that the Qscale for the first I-VOP is calculated as follows:

DefaultTargetBits=Height*Width*8/DefaultCompressionRatio;//for Luminance part

DefaultTargetBits+=(Height*Width/2*8/(DefaultCompressionRatio*2);//for Chroma part TargetBits=min(TargetBits,($VbvBuf$Size−InitialOccupancy)*0.2)

$Q$scale=DefaultTargetBits*Default$Q$Scale/TargetBits

To further refine the calculation, two difference encoding modes (streaming mode and non-streaming mode) are preferably utilized to lower the Qscale further, and bounded, such as by Qscale=8 for minimum image quality in this example.

3.4 QP Value for the Subsequent I-VOP

Besides the first I-VOP, QP values for the subsequent I-VOPs also need to be considered. Although an RD model for I-type VOP can be developed, due to its high complexity and without considering video quality of its neighboring frames, the present invention employs a simple scheme to determine the QP value of I-VOP. In accordance with the invention, the QP value depends on three factors: (1) previous QP value, (2) calculated QP value (target QP) obtained in Section 3.2, and (3) the current buffer fullness as follows:

```
If (Buffer occupancy − Initial Occupancy) > 0, implying under-spending
bits,
    then
If (PrevQP > TargetQP)
    TargetQP = TargetQP * ( 1 − (1−deviation)^2) +
    PrevQP * (1−deviation)^2) and is bounded by
        (TargetQP + PrevQP ) /2;
If (PrevQP <= TargetQP)
    TargetQP = PrevQP * ( 1 − (1−deviation)^2) +
        TargetQP * (1−deviation)^2)
where deviation = (Occupancy − InitialOccupancy) /
        (VbvBufSize−InitialOccupancy).
```

Figure 2:
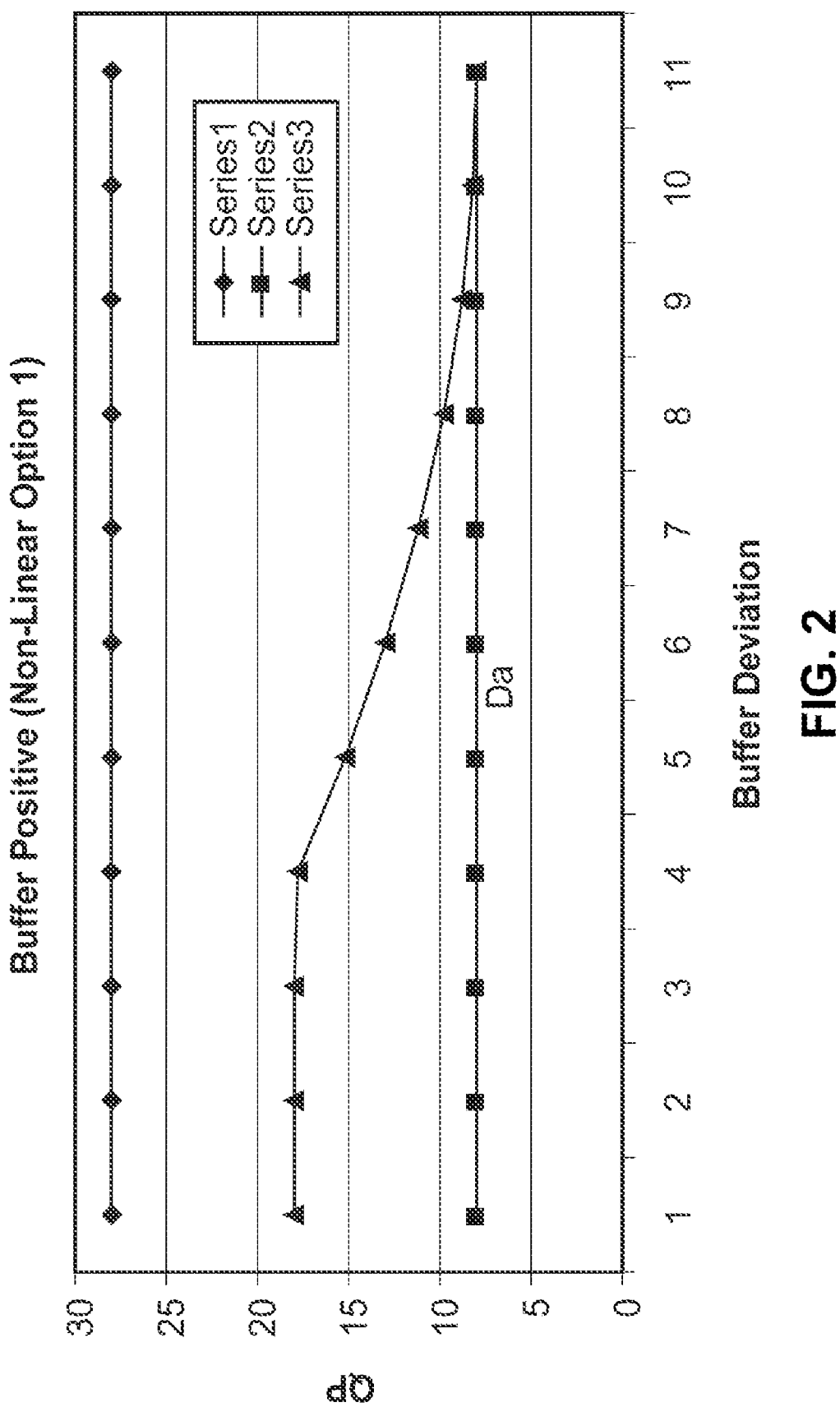
FIG. 2 is a graph showing QP as a function of buffer deviation corresponding to the left half of Table 2.
Figure 3:
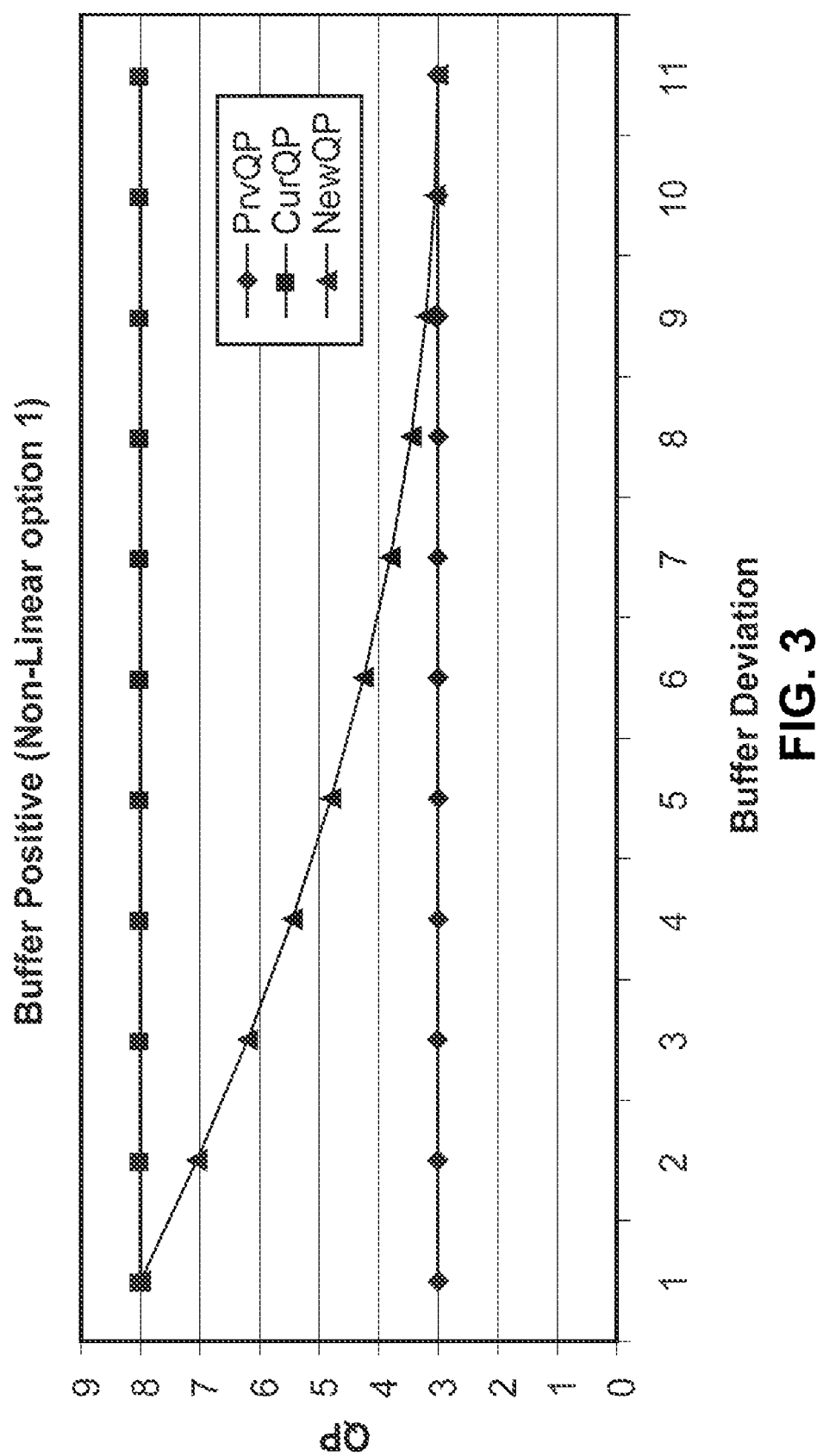
FIG. 3 is a graph showing QP as a function of buffer deviation corresponding to the right half of Table 2.

In Table 2 and FIG. 2 and FIG. 3, two examples are shown to demonstrate the Qscale calculations under these conditions. The left hand side shows that if PrevQP (e.g., 28)>TargetQP (e.g., 8), then the final QP is shown in column 5. The right hand side of the table, on the other hand, shows that if PrevQP (e.g., 3)<TargetQP (e.g., 8), and the final QP is calculated in the last column.

On the other hand,

```
if (Buffer occupancy − Initial Occupancy) < 0 // implying over-spending
bits
If (PrevQP > TargetQP)
    TargetQP = PrevQP * (deviation^2) + TargetQP * (1−deviation^2)
If (PrevQP <= TargetQP)
    TargetQP = TargetQP * (deviation^2) + PrevQP * (1−deviation^2)
where deviation = (InitialOccupancy − Occupancy) / (InitialOccupancy).
```

Figure 4:
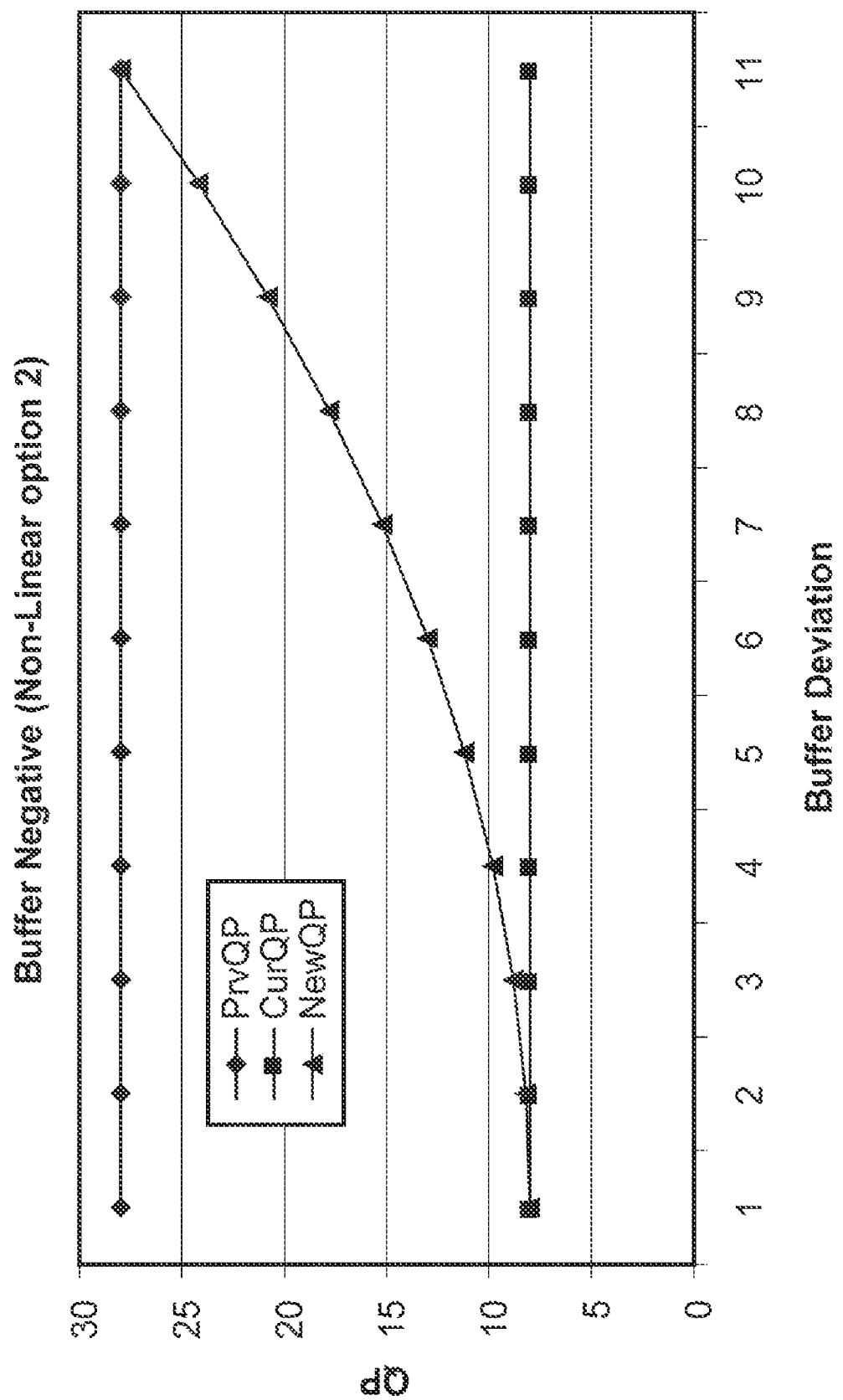
FIG. 4 is a graph showing QP as a function of buffer deviation corresponding to the left half of Table 3.
Figure 5:
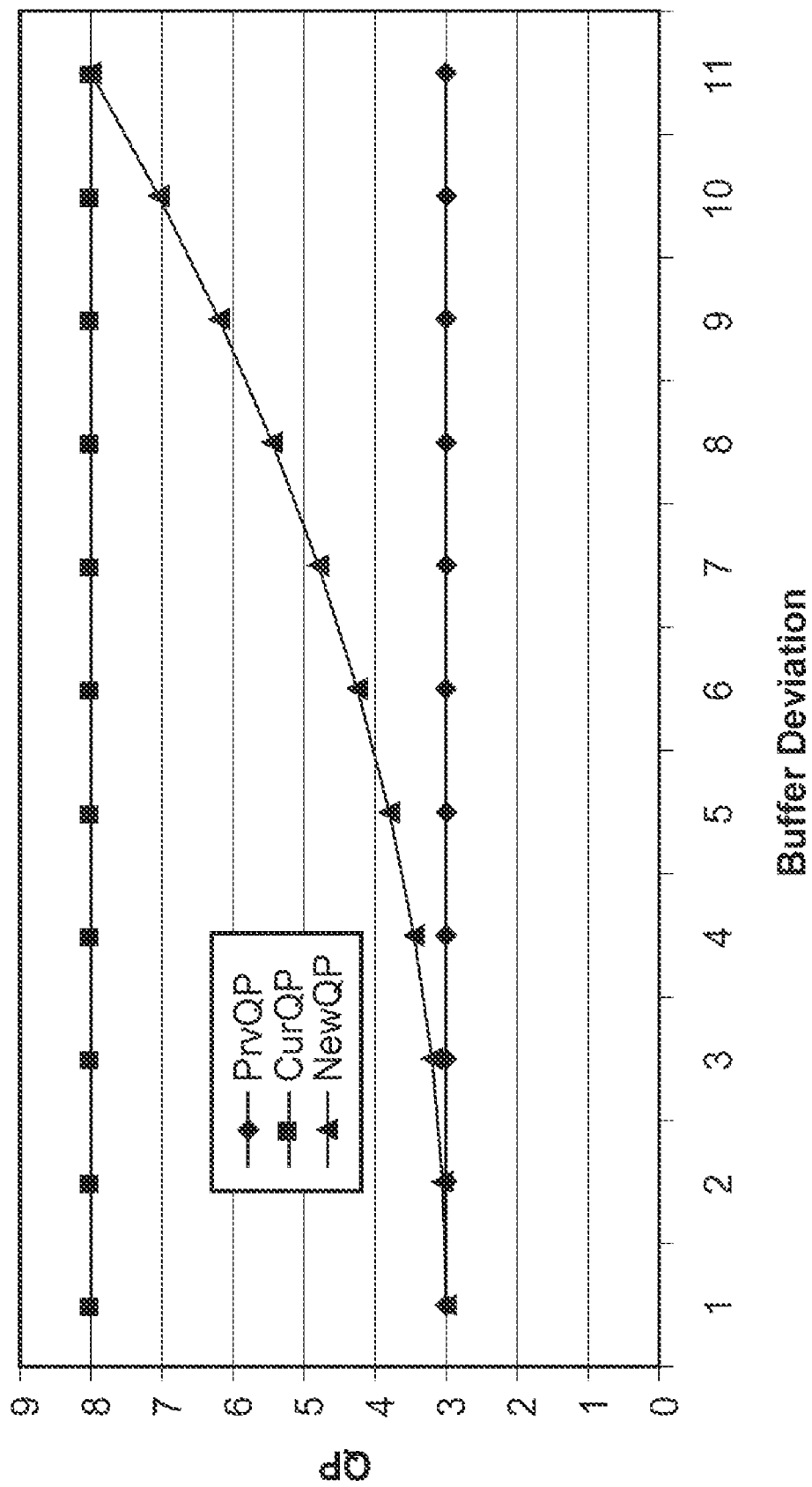
FIG. 5 is a graph showing QP as a function of buffer deviation corresponding to the right half of Table 3.

In Table 3 and FIG. 4 and FIG. 5, two examples are shown to demonstrate the Qscale calculations under these conditions. The left hand side shows that if PrevQP (e.g., 28)>TargetQP (e.g., 8), then the final QP is shown in column 4. The right hand side of the table, on the other hand, shows that if PrevQP (e.g., 3)<TargetQP (e.g., 8), then the final QP is calculated in the last column.

3.5 QP Value for the First P-VOP

The QP value for the first P-VOP is calculated as follows. First, the target bit rate for this VOP is obtained by the bit allocation module. Then its QP can be derived from the following equation empirically. To prevent the occurrence of a sudden quality change, this QP is bounded by its previous I-VOP's Qscale, and further bounded by MinQP and MaxQP.

$$dQCur = (m\_iActualBitPrvI * m\_iQPrvI)/(8.0 * m\_iTargetBitCur)$$

$$dQCur = \text{limit}((double)m\_iQPrvI, m\_dQCur, (double) m\_iQPrvI + 2)$$

$$iQCur = \text{limit}(m\_iMinQScale, (int)m\_dQCur, m\_iMaxQScale)$$

3.6 QP Calculation for P-VOP

To calculate a target Qscale, the following five steps are performed:

Step 1: calculate the average bit count (AvgTargetBitP) obtained in the "bit allocation" module (using future frames) as follows:

$$iAvgTargetBitP = (iTotalBudget/(dRCWindowSize+3.7) * RC\_SPAN)$$

Step 2: calculate the previous bit count (ActualBitPrv) (using past encoded frame)

Step 3: calculate the target Qscale using AvgTargetBit and ActualBitPry to adjust the deficit/surplus bit rate budget. If the previous P-VOP spent 15% more than an average bit count, then QP should be increased by its deviation. If the previous P-VOP spent around 20% less than an average bit count, then QP should be decreased by its deviation.

If none of these two conditions, then QP remains unchanged. The description of this step is pseudo-encoded as follows:

```
if (iActualBitPrvP > iAvgTargetBitP*1.15) {
    dQCur =     (iQPrv + (iQPrv*(iActualBitPrvP−
                    AvgTargetBitP)/iAvgTargetBitP)*0.55 );
}
else if (iActualBitPrvP < m_iAvgTargetBitP/1.20) {
    dQCur =     (iQPrv − (iQPrv*(iAvgTargetBitP−
                    iActualBitPrvP)/iAvgTargetBitP)*0.55 );
}
else
    dQCur = iQPrv;
```

Step 4: refine Qscale using SAD statistics from past encoded frames and current buffer status. Refining Qscale is conjunction with buffer control and SAD statistics. In the case of over-spending bit budget (i.e., case 1), the encoder has to consider the potential buffer underflow problem by increasing Qscale. The Qscale is scaled up by buffer deviation. Besides, to further refine Qscale, SAD is used to determine the final Qscale. If the deviation of the current SAD is larger than 10%, meaning a more complex scene is on its way, thus the final Qscale should be increased by the amount of iQPrv* (dBufDeviationP/dScale, where iQPrv is the previous Qscale to take a early action before a buffer underflow occurs. If the deviation of the current SAD is smaller than about 10%, a less complex scene is expected, then the final Scale can be adjusted by its buffer status and bounded by its previous Qscale to maintain a certain degree of video quality. The following pseudo-code describes the procedure to refine Qscale:

```
dSadDeviationP = (dSadCurP − dAvgSadCurP)/dAvgSadCurP;
dDifferenceP = (double)(m_iOccupancy − m_iInitialOccupancy);
// Case 1: potential buffer underflow!!
if (dDifferenceP < 0.0) {
    dScale = 1.5;
    dBufDeviationP = −1*dDifferenceP/iInitialOccupancy;
if (dSadDeviationP > 0.1) {
    dQCur = limit(iQPrv, (dQCur), iQPrv+iQPrv*(dBufDeviationP/
        dScale));
}
else if (dSadDeviationP < −0.1) {
    dQCur = limit(iQPrv−iQPrv*(dBufDeviationP/dScale), (m_dQCur),
        iQPrv);
}
else
    dQCur = limit(iQPrv−iQPrv*(dBufDeviationP/dScale), (m_dQCur),
        iQPrv+iQPrv*(dBufDeviationP/dScale));
}
```

In the case of under-spending bit budget (i.e., case 2), the encoder has more room to maintain the video quality. In this case, the SAD is used to scale down the Qscale by its deviation to the average SAD values. If the deviation of the current SAD is larger than about 10%, meaning a more complex scene is on its way, thus the final Qscale will be bounded by the PrevQscale or less to maintain constant quality since the encoder has more bits available to spend. The final value of Qscale is decreased by the amount of iQPrv*(dBufDeviationP/dScale, where iQPrv is the previous Qscale. If the deviation of the current SAD is smaller than about 10%, a less complex scene is expected, then the final Qscale can be maintained to avoid sudden quality change, even though the change is directed to quality improvement. If none of the above two conditions holds, meaning a smooth scene is expected, the final Qscale is adjusted based on its buffer states.

The following pseudo-code describes the procedure to refine Qscale:

```
// case 2: easy mode for rate control
else {
    dScale = 2.0;
    dBufDeviationP = dDifferenceP/(double)m__iInitialOccupancy;
    if (dSadDeviationP > 0.1) {
        dQCur = limit(iQPrv−iQPrv*(dBufDeviationP/dScale),
            (m__dQCur), iQPrv);
    }
    else if (dSadDeviationP < −0.1) {
        dQCur = limit(iQPrv, (m__dQCur),
            iQPrv+iQPrv*(dBufDeviationP/dScale));
    }
    else {
        dQCur = limit(iQPrv−iQPrv*(dBufDeviationP/dScale),
            (m__dQCur),
            iQPrv+iQPrv*(dBufDeviationP/dScale));
    }
}
```

Step 5: bound Qscale in the range of pre-defined MinQP and MaxQP.

4. Execution Phase 2: Encoding

In the encoding stage, if either the frame- or object-level rate control can be activated, the encoder just simply encodes the video frame or object using the value of QP obtained in the pre-encoding stage. However, some low-delay applications may require more strict buffer regulations, for example 250 ms for the maximal accumulated delay, or higher bit rate encoding (e.g., 1~4 Mbps encoding at CCIR-601 resolution), or perceptual-based encoding, then a macroblock-level rate control is expected. However, the macroblock level rate control is costly at low rate since there is additional overhead if the quantization parameter is changed within a frame. For example, in the MPEG-4 video, the MB (MacroBlock) type has to be encoded with three more bits indicating the existence of the differential quantization parameter (i.e., dquant).

Furthermore, two bits need to be sent for dquant as described in MPEG-4 documentation. For the same prediction mode, an additional 5 bits need to be transmitted in order to change QP. In the case of encoding at 10 kbps, 7.5 fps, qcif resolution, the overhead is computed as high as 99*5*7.5=3.7 kbps. If only 33 macroblocks are encoded, the overhead 33*5*7.5=1.2 kbps. Thus, there will be about 10 percent loss in compression efficiency at low bit rate encoding. At high bit rate, the overhead bit count is less significant than the residual bit count.

5. Execution Phase 3: Post-Encoding

In the post-encoding stages, the encoder simply records the statistical data such as the bit usage, MAD or SAD and the distortion of the decoded picture from its original picture. The encoder also updates a VBV buffer status. Unlike the first order or the second order rate distortion models that requires computational load for model parameter derivation.

5.2 VBV Buffer Update

To update the VBV buffer status, the channel input rate to the VBV buffer is calculated based on the lapsed time. Then if the VBV buffer fullness (i.e., iOccupancy) is smaller than the actual coded size of the current frame, then a buffer underflow occurs. To deal with buffer underflow, one solution in the present invention is to freeze the previous frame by replacing the already encoded bits with stuffing bits which basically assume all macroblocks are marked as Skip macroblocks. In the case of buffer overflow, an easy solution which involves stuffing more bits into the bitstream may be utilized. The number of stuffing bits is given by:

iOccupancy−iOverFlowLevel

Wherein iOverFlowLevel is around the size of the VBV buffer. The pseudo-code of this part is shown below:

```
if (iOccupancy <= (iActualBitCur+8) {
    // buffer underflow
    replacing the coded bits of the current frame with stuffing bits
}
else {
    iNumberOfStuffingBits = iOccupancy − iOverFlowLevel;
    if (iNumberOfStuffingBits > 0)
        do bits stuffing (iNumberOfStuffingBits);
    else
        iNumberOfStuffingBits = 0;
}
Occupancy += iChannelInputRate − iNumberOfStuffingBits
```

B. Scalable Macro-Block Rate Control

1. Overview

The following discussion illustrates an example embodiment of the present invention. It will be appreciated that labels, terms, sequences and other specific parameters are used in connection with the example described herein and may be changed without departing from the scope of the invention.

1.1 Introduction

Figure 6:
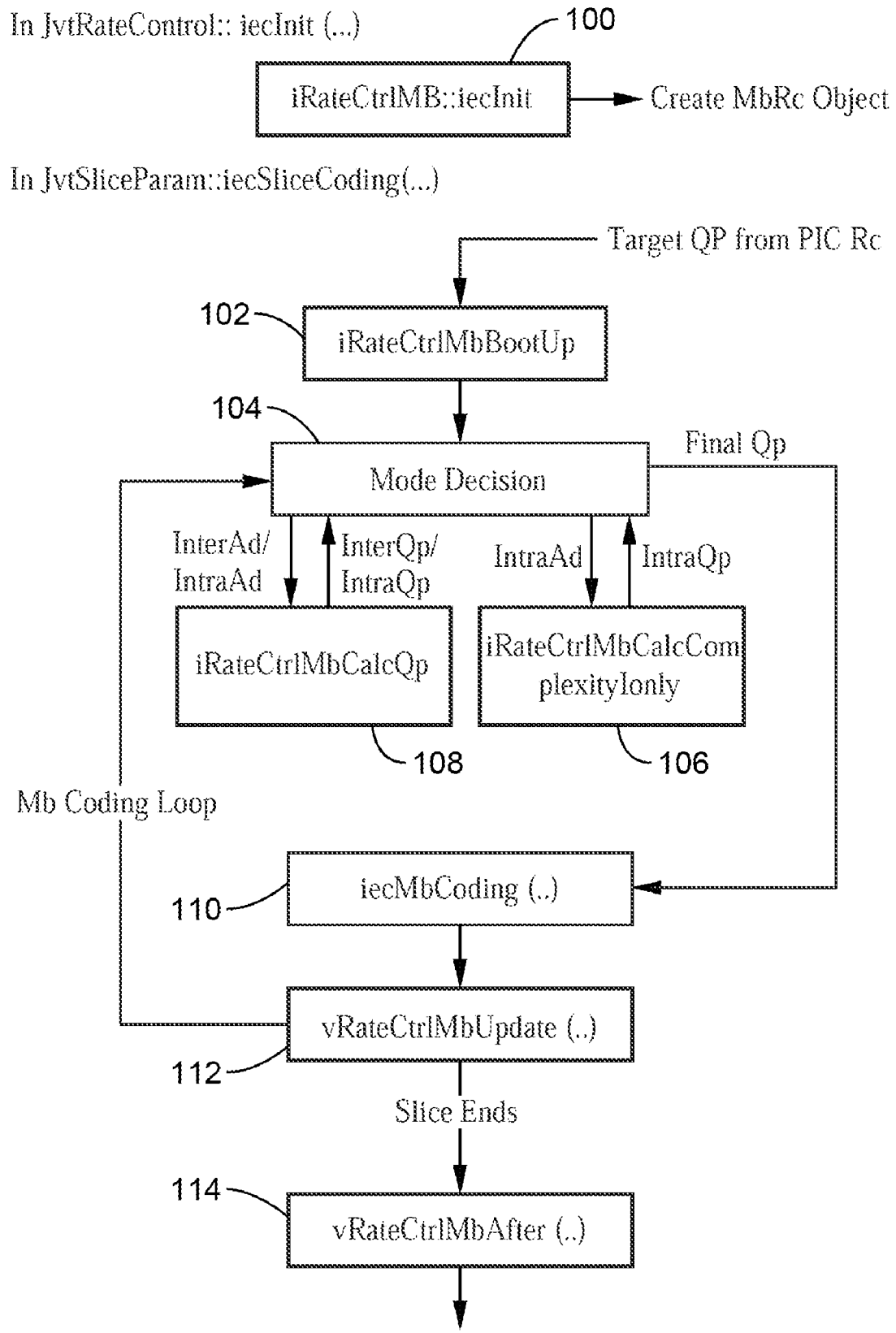
FIG. 6 is a flow diagram of an embodiment of a method for scalable macro block control according to an embodiment of the present invention.

The macro-block rate control (MbRc) methodology of the present invention is intended for bit rate and quality control for MPEG-4 encoders, such as the Sony MPEG-4 AVC/ITU H.264 encoder. To activate this MbRc, its picture level rate control must be enabled to pass the target QP of a frame to MbRc. Note that the methodology of the MbRc can be applied to any rate control scheme as long as the Qp value for a picture is provided. There are two versions of this implementation of MbRc. One is the floating-point implementation for high performance computing system (e.g., Intel IA-32 platform); the other is fixed point implementation for ARM based platform without powerful floating-point capability. This new MbRc is based on the notion of "intensity", it is very simple to implement, and provides very effective performance in visual quality. A flow diagram of the methodology is illustrated in FIG. 6 wherein the MB rate control steps are shown in blocks 100, 102, 106, 108, 112 and 114.

1.2 Enabling Floating Point MB-RC

Floating point MB-RC is enabled as follows:

```
In StatisticalDefine.h file,
#define NEW__PIC__RC
#define __SRC__MB__   // turn on MB rate control
```

1.3 Enabling Fixed Point MB-RC

Fixed point MB-RC is enabled as follows:

```
In StatisticalDefine.h file,
#define NEW_PIC_RC
#define _SRC_MB_    // turn on MB rate control
In JvtScalableRateControlMB.h
#define SRCMB_INT_
```

1.4 Enabling Statistical Printout

Statistical printout is enabled as follows:

```
In JvtScalableRateControlMB.h
Prerequisite: _SRC_MB_ is enabled in StatisticDefine.h
if (defined(_SRC_MB_INFO_ONLY_) &&
    defined(_SRC_MB_PRINTOUT_) then
    MB info of PIC-level RC is recorded
if (undefined(_SRC_MB_INFO_ONLY_) &&
    defined(_SRC_MB_PRINTOUT_) then
    MB-level RC is enabled and MB info is recorded
//#define _SRC_MB_INFO_ONLY_
#define _SRC_MB_PRINTOUT_
```

2. MB-RC Class Structure

2.1 Data Members

The following are examples of data members used in this embodiment of this invention:

```
JvtRcParameter*  m_pRcParameter;     // Pointer of JvtRcParameter class
JvtPicParam*     m_pPicParam;        // Pointer of JvtPicParam class
JvtMbParam*      m_pMbParam;         // Pointer of JvtPicParam class
int              m_iMB_h;            // number of MBs in x-axis
int              m_iMB_v;            // number of MBs in y-axis
int              m_iNumOfMb;         // total number of MBs
int              m_iNumofCodedMb;    // total number of coded MBs
int              m_iPicTypeCur;      // picture type of the current frame
int              m_iRetryCount;      // retry counter
int              m_iMbAccmQp;        // accumulated syntax Qps
int              m_iMbQpCur;         // syntax Qp of current MB
int              m_iMbQpPrv;         // syntax Qp of previous MB
int              m_iPicEstSyntaxQp;  // estimated Qp from PicRc
int              *m_piMbMad;         // a pointer to a Mad map
int              m_iMbAvgMad;        // average Mad of a slice(frame)
int              m_iMbAvgAd;         // average Ad of a slice(frame)
int              m_iMbTotalAd;       // total Ad of a slice
int              *m_piMbDistortionMap; // a pointer to a distortion map
int              m_iMbIntraAdCur;    // IntraAd of current MB
int              m_iMbInterAdCur;    // InterAd of current MB
int              m_iMbIntraQp;       // IntraQp of current MB
int              m_iMbInterQp;       // InterQp of current MB
#ifdef _SRC_MB_INT_
int              m_iQpScale;
int              m_iQpConverge;
int              m_iAdjustStepSize;
int              m_iMbAvgDistortion;
int              m_iPicEstActualQp;
static const int m_iQpActualToSyntaxTable[365];
#else // _SRC_MB_INT_
double           m_dQpScale;         // Qp scalor to converge MbQp to PicQp
double           m_dQpConverge;      // converge speed
double           m_dAdjustStepSize;  // QpStep granularity
double           m_dMbAvgDistortion; // Average distortion
double           m_dPicEstActualQp;  // Estimated Actual Pic Qp
#endif//_SRC_MB_INT_
```

2.2 Member Functions

The following are examples of the member functions employed in the present invention:

```
int    iecInit(JvtRcParameter *pRcParameter, JvtEtcParameter
         *pEtcParameter);
int    iRateCtrlMbBootUp(JvtRcParameter *pRcParameter, JvtPicParam*
         pJvtPicParam, int iOverheadBits);
int    iRateCtrlMbCalcComplexityIonly(int iMbNum, JvtPicParam*
         pPicParam, int iIntraAd);
int    iRateCtrlMbCalcQp(int iMbNum, JvtMbParam* pMbParam,
         int iIntraAd, int iInterAd);
int    iRateCtrlMbUpdate(int iMbNum, JvtMbParam* pMbParam,
         int iPicActBit);
Int    iRateCtrlMbAfter( );
```

3. MB-RC Implementation

Various parameters and functions associated with the methodology of the present invention are described as follows:

3.1 MB-RC iecInit

The member function iecInit (JvtRcParameter*pRcParameter, JvtEtcParameter*pEtcParameter) creates a working memory, and initializes slice-wide variables including: m_iMB_h, m_iMB_v, m_iNumOfMb and m_iQpConverge.

3.2 MB-RC Boot Up

The member function iRateCtrlMbBootUp(int iRetryCount, JvtPicParam*pJvtPicParam, int iOverheadBits) is called before encoding a slice in JvtSliceEncoding before the MB-coding loop. This function generally performs content complexity analysis and initializes slice-wide variables. Note that iRetryCount indicates the number of occurrences of re-encoding the current slice due to the VBV underflow. Normally it comprises a zero value. The MB-RC Boot Up process proceeds according to the following steps.

Step 1: Calculate the MAD of each MB, comprising 4 blocks, as a basis for content complexity estimation, from the following:

MbMad=(MAD of the original source frame) per pixel $$(int)\left(\left(\sum_{i=0}^{i=3}\sum_{j=0}^{j=63}|X_{i,j}-\overline{X}_i|\right)\bigg/256.0\right)$$

where $X_{i,j}$ denotes the pixel value at position j at block i, and $\overline{X}_i$ denote the mean value of the block i.

Step 2: Calculate the average MAD of the entire frame or slice from the following:

$$MbAvgMad = \left(\left\{\sum_{n=0}^{n=k}\left[(int)\left(\left(\sum_{i=0}^{i=3}\sum_{j=0}^{j=63}|X_{i,j}-\overline{X}_i|\right)\bigg/256.0\right)\right]\right\}\bigg/k\right)$$

where k is the total number of MBs.

Step 3: Determine the intensity base of the entire frame/slice as follows:

IntensityBase=(MbAvgMad+1)/2 where IntensityBase is used as a bias to avoid large variation of intensity due to small MAD values.

Step 4: Determine the Qp dynamic range (i.e., LocalAdjRange) of the entire frame/slice as follows:

LocalAdjRange=min((51−SyntaxQp)*(SyntaxQp+200)/6400.0,MAX_RANGE), wherein MAX_RANGE=0.3 in this implementation. Certainly this number is controllable, depending on the scene content of a sequence. This value can be changed either in sequence base or in frame base. The larger its value is, the broader the Qp dynamic range is. If MAX_RANGE=0.0, then the Qp of the underlying picture level is used.

3.3 MB-RC Qp Calculation
3.3.1 I-Slice Coding
For I-slice:
iRateCtrlMbCalcComplexityIonly(int iMbNum, JvtPicParam*pPicParam, int iIntraAd)

Step 1: Obtain iMbIntraAdCur from Mode decision module and divide IntraAd by 256 for per pixel basis.

Step 2: Calculate various intensities. Here, two separate cases are considered: Case 1 is to encode the first I-frame where there is no average Ad and distortion information is available except the retrying encoding (then average Ad and distortion information is available, and Case 2 can be applied). Case 2 is a regular I-frame, which is inserted in every certain pre-specified interval.

Case 1: Scene Change I Slice or the First I Slice given no retry encoding:

MadIntensity=(MbMad[iMbNum]+1)/(MbAvgMad+1);

AdIntensity=(MbInterAdCur+1)/(EstMbAvgAd+1);

Where EstMbAvgAd=(m_iMbAvgMad+1)/MAD_DIV_AD_PER_PIXEL, and MAD_DIV_AD_PER_PIXEL=1.5 in this implementation based on the empirical values in Tables 4 and 5 which show the MAD and AD value in the selected sequences, and their relation.

Next, the index is calculated, T1, representing coding (i.e., Ad) activity, and limit T1 in +/−LocalAdjRange that is calculated in step 4 of section 3.2 to avoid large fluctuations.

T1=MadIntensity/AdIntensity

These indexes provide a measure of the intensity of Mad versus Ad. The basic empirical observation is to assume that if T1 equals to 1, meaning that Ad and Mad both are in average level, the Qp level should be kept at the Pic target Qp. If T1 is greater than 1, meaning the content of this MB is pretty busy (above average), its coding complexity (AD) is below average, so its QP will be increased due to its high complex content. On the other hand, if T1 is smaller than 1, then Qp will be decreased due to its "easy", or flat content.

```
If (MadIntensity <= 1.0) {
    T1 = MIN(T1, MadIntensity)
}
else {
    T1 = MAX(T1, MadIntensity)
}
```

To weigh the content complexity of a MB, we also add the above MIN and MAX operations to ensure the MB is properly interpreted.

Then limiting IntraLocalAdj:
//coding intensity
IntraLocalAdj=limit(1−LocalAdjRange, T1, 1+LocalAdjRange);

Case 2: Regular I-Frame(Slice). In addition to the above similar calculations for Case 1, an additional index T2 is needed. The new intensity calculations are listed below:

DistIntensity=(MbDistortionMap[iMbNum]+IntensityBase)/(MbAvgDistortion+IntensityBase)

MadIntensity=(MbMad[iMbNum]+IntensityBase)/(MbAvgMad+IntensityBase)

AdIntensity=(MbInterAdCur+IntensityBase)/(MbAvgAd+IntensityBase);

where IntensityBase is derived in step 3 of section 3.2.

Next, indices, T1, and T2, are calculated which represent coding (i.e., Ad) activity and Distortion versus Mad, and limit T1 and T2 in +/−LocalAdjRange calculated in step 4 of section 3.2 to avoid large fluctuations.

T1=MadIntensity/AdIntensity

T2=MadIntensity/DisIntensity

Then,

```
If (MadIntensity <= 1.0){
    T1 = MIN(T1, MadIntensity)
    T2 = MIN(T2, MadIntensity)
}
else{
    T1 = MAX(T1, MadIntensity)
    T2 = MAX(T2, MadIntensity)
}
```

Then limiting T1 and T2

```
// coding intensity
T1 = limit(1−LocalAdjRange, T1, 1+LocalAdjRange);
// distortion intensity
T2 = limit(1−LocalAdjRange, T2, 1+LocalAdjRange);
```

Next, combining both indexes into one by weighting each index as:

IntraLocalAdj=X*T1+(1.0−X)*T2 wherein X is an empirical value, and can be controlled by the application, such as given by X=0.5 in this implementation.

From this point, both cases execute the following steps.
Step 3: determine the QpStep granularity as:

IntraLocalAdjust=(IntraLocalAdjust−1.0)*AdjustStepSize.

Note that AdjustStepSize is decided by the content complexity of the current MB. AdjustStepSize is a key factor to determine the range of Qp dynamic changes and is derived as:

dAdjustStepSize = (iMbQpGap-m_iPicEstSyntaxQp) * 0.01 and iMbQpGap = 200 if m_piMbMad[iMbNum] < m_iMbAvgMad;
= 80 if (m_piMbMad[iMbNum] > m_iMbAvgMad)
= 130 otherwise.

Note that these numbers (200, 80 and 130) are empirical numbers, and can be modified as needed. The value m_iMbAvgMad is the average Mad per pixel and m_piMbMad[iMbNum] is the Mad value per pixel of the current MB, iMbNum. The detail is described in section 3.2. It should be appreciated that as the value of AdjustStepSize increases, the Qp dynamic range increases.

Step 4: IntraLocalAdjust is offset by the average local adjust of its previous slice(frame) in order to be closer to the target picture Qp.

$$Intra\text{Local}Adj\mathrel{-}=Avg\text{Local}Adj$$

Step 5: calculate the first actual Qp=m_dPicEstActualQp*(1+IntraLocalAdj)

Step 6: convert to the syntax m_iMbQpCur from (int) (6*log(Qp)/log(2)+0.5).

Step 7: smooth iMbQpCur using a simple linear filter $$m\_iMbQpCur=(int)(m\_iMbQpPry*SRC\_MB\_PRVMB\_EFFECT+m\_iMbQpCur*(1.0-SRC\_MB\_PRVMB\_EFFECT))$$

where iMbQpPry is the syntax Qp of the previous MB, and SRC_MB_PRVMB_EFFECT is the weighting factor of the previous MB. In this implementation, its value is 0.2.

Step 8: finally the iMbQpCur is capped between SRC_MB_MIN_SYNTAX_QP and SRC_MB_MAX_SYNTAX_QP.

3.3.2 P-Slice Coding
For P-slice and B-slice:
iRateCtrlMbCalcQp(intiMbNum,
    JvtMbParam*pMbParam, int I IntraAd, int iInterAd)

The following discussion is for a inter macro-block only. For a inter macro-block, all of the execution steps are very similar, except changing Inter MB to Intra MB.

Step 1: Obtain IntraAd and InterAd from Mode decision module and divide IntraAd and InterAd by 256 for per pixel basis.

Step 2: Calculate Distortion, Mad and Ad intensity as follows:

$$Dist\text{Intensity}=(Mb\text{DistortionMap}[iMbNum]+\text{Intensity-Base})/(MbAvg\text{Distortion}+\text{IntensityBase})$$

$$Mad\text{Intensity}=(Mb\text{Mad}[iMbNum]+\text{IntensityBase})/(MbAvg\text{Mad}+\text{IntensityBase})$$

$$Ad\text{Intensity}=(Mb\text{Inter}AdCur+\text{IntensityBase})/(MbAvgAd+\text{IntensityBase})$$

Note that the DistortionMap and its average is derived from its previous frame (slice) since we assume that the content activity between two successive frames (except scene cut) is very similar in co-location MB. And the AvgAd is obtained from its previous frame (slice) too.

Step 3: Calculate two indexes, T1 and T2, representing coding (i.e., Ad) and content (i.e., Distortion) activities, and limit T1 and T2 in +/−LocalAdjRange in section 3.2 to avoid large fluctuations, where its maximum value is 0.3 in this example. If LocalAdjRange=0.0, then the picture level Qp is used.

$$T1=Mad\text{Intensity}/Ad\text{Intensity}$$

$$T2=Mad\text{Intensity}/Dist\text{Intensity}$$

These indexes provide a measure of the intensity of Mad versus Ad, and distortion. The basic empirical observation is to assume that if T1 equals to 1, meaning that Ad and Mad both are in average level, the Qp level should be kept at the Pic target Qp. If T1 is large than 1, meaning the content of this MB is pretty busy (above average), its coding complexity (AD) is below average, so its QP will be increased due to its high complex content. On the other hand, if T1 is smaller than 1, then Qp will be decreased due to its "easy", or flat content.

```
If (MadIntensity <= 1.0) {
    T1 = MIN(T1, MadIntensity)
    T2 = MIN(T2, MadIntensity)
}
else {
    T1 = MAX(T1, MadIntensity)
    T2 = MAX(T2, MadIntensity)
}
```

To weigh the content complexity of a MB, we also add the above MIN and MAX operations to ensure the MB is properly interpreted.

Step 4: combine both indexes into one by weighting each index as:

$$Inter\text{LocalAdjust}=X*T1+(1.0-X)*T2$$

wherein X is an empirical value, and can be controlled by the application, such as given by X=0.5 in this implementation.

Step 5: determine the QpStep granularity as $$(Inter\text{LocalAdjust}-1.0)*AdjustStepSize.$$

Next we decide the Qp directions (increasing/decreasing) depending on the result of step 5. If it is less than 1, then Qp will be decreased by (InterLocalAdjust−1.0) times AdjustStepSize. AdjustStepSize is a key factor to determine the range of Qp dynamic changes and is derived as:

$$dAdjustStepSize = (iMbQpGap\text{-}m\_iPicEstSyntaxQp)*0.01 \text{ and}$$

$$iMbQpGap = 200 \text{ if } m\_piMbMad[iMbNum] < m\_iMbAvgMad,$$
$$= 80 \text{ if } (m\_piMbMad[iMbNum] > m\_iMbAvgMad)$$
$$= 130 \text{ otherwise.}$$

Note that these numbers (200, 80 and 130) are empirical values, and can be modified as needed. The value m_iMbAvgMad is the average Mad per pixel and m_piMbMad[iMbNum] is the Mad value per pixel of the current MB, iMbNum. The detail is described in section 3.2. The larger the value of AdjustStepSize, the greater the Qp dynamic range.

Step 6: InterLocalAdjust is offset by the average local adjust of its previous slice(frame) in order to be closer to the target picture Qp.

$$Intra\text{Local}Adj\mathrel{-}=Avg\text{Local}Adj$$

Step 7: calculate the first actual Qp=m_dPicEstActualQp*(1+dIntraLocalAdj)

Step 8: convert to the syntax m_iMbQpCur from (int) (6*log(Qp)/log(2)+0.5)

Step 9: smooth iMbQpCur using a simple linear filter $$m\_iMbQpCur=(int)(m\_iMbQpPry*SRC\_MB\_PRVMB\_EFFECT+m\_iMbQpCur*(1.0-SRC\_MB\_PRVMB\_EFFECT)),$$

where iMbQpPry is the syntax Qp of the previous MB, and SRC_MB_PRVMB_EFFECT is the weighting factor of the previous MB. In this example, its value is 0.2.

Step 10: finally the iMbQpCur is capped between SRC_MB_MIN_SYNTAX_QP and SRC_MB_MAX_SYNTAX_QP.

3.4 MB-RC Update
iRateCtrlMbUpdate(int iMbNum,
    JvtMbParam*pMbParam, int iPicActBit)

This function provides for collecting the actual AD (depending on MB-type), Qp, and determining the QpScale value for the next MB coding.

3.5 MB-RC Clean Up iRateCtrlMbAfter( )

This function is to calculate the distortion of a MB, and sum up for a frame. It also calculates the average Ad of a frame. The MB distortion is its Sum of Absolute Difference (SAD).

4. Details of MB Rate Control Steps

4.1 MB Rate Control Execution Flow and Data Flow

Referring again to FIG. 6, the execution flow and data flow according to an embodiment of the invention is illustrated as follows.

Block 100 illustrates the iecInit step which comprises the following:
- (a) initialize data members;
- (b) set image dimension information is set; and
- (c) allocate working memory.

Block 102 illustrates the iRateCtrlMbBootUp step which comprises the following:
- (a) Obtain the picture level target Qp from picture level rate control;
- (b) Calculate each MB content complexity (MbMad) and average Mad;
- (c) Determine intensity base; and
- (d) Determine local adjust range.

Block 104 illustrates the Mode Decision step which comprises calculating InterAD and IntraAD. If the steps at blocks 106 and 108 have already been executed, the mode decision module determines the final mode and its Qp.

Block 106 illustrates the iRateCtrlMbCalcComplexity-Ionly step which comprises the following:
- (a) Obtain InfraAd from mode decision module;
- (b) Calculate MB-level Qp in I-slice; and
- (c) Send this Qp back to mode decision module.

Block 108 illustrates the iRateCtrlMbCalcQp which comprises the following:
- (a) Obtain IntraAd and InterAd from mode decision module;
- (b) Calculate two MB-level Qps, IntraQp and InterQp, for Inter mode and Intra mode, respectively in P-slice; and
- (c) Send back these two Qps to mode decision module.

Block 110 illustrates the iecMbCoding step which comprises encoding the current MB.

Block 112 illustrates the vRateCtrlMbUpdate step which comprises the following:
- (a) Accumulate Qp, Ad and the number of coded MBs; and
- (b) If no mode MB coding, jump to block 104, else go to block 114.

Block 114 illustrates the vRateCtrlMbAfter step which comprises the following:
- (a) Calculate the distortion of the current frame;
- (b) Calculate the average Ad for the next frame; and
- (c) Calculate the average LocalAdj for the next frame.

4.2 Content Complexity Representation

Content complexity analysis, per MB Mad calculation and its average value, is performed before the first MB of a slice is encoded. The calculation of per MB Mad and its average is shown below.

(a) Calculating the MAD of each MB, comprising 4 blocks, as a basis for content complexity estimation.

$$MbMad = (\text{MAD of the original source frame}) \text{ per pixel}$$

$$(int)\left(\left(\sum_{i=0}^{i=3}\sum_{j=0}^{j=63}|X_{i,j} - \overline{X}_i|\right)/256.0\right)$$

Wherein $X_{i,j}$ denotes the pixel value at position j at block i, and $\overline{X}_i$ denote the mean value of the block i.

(b) Calculating the average MAD of the entire frame or slice:

$$MbAvgMad = \left(\left\{\sum_{n=0}^{n=k}\left[(int)\left(\left(\sum_{i=0}^{i=3}\sum_{j=0}^{j=63}|X_{i,j} - \overline{X}_i|\right)/256.0\right)\right]\right\}/k\right)$$

Wherein k is the total number of MBs.

4.3 Intensity Based Qp Adjustment

The present invention further comprises a new intensity based approach to derive the Qp value for each MB. The intensity is defined as (current_value)/(average_value). In this implementation, three different intensities are used; namely Mean Absolute Difference (MAD) intensity, Absolute Difference (AD) intensity, and Distortion intensity. Furthermore, to reduce the "noise" effect on this calculation, an intensity base is added, which is used to reduce this effect to avoid large Qp fluctuation. In this implementation, the intensity based is defined as (average MAD)/2.

The three intensities according to the present invention are defined as:

$$DistIntensity = (MbDistortionMap[iMbNum] + IntensityBase)/(MbAvgDistortion + IntensityBase)$$

$$MadIntensity = (MbMad[iMbNum] + IntensityBase)/(MbAvgMad + IntensityBase)$$

$$AdIntensity = (MbInterAdCur + IntensityBase)/(MbAvgAd + IntensityBase);$$

Note that the MAD and AD calculations were previously defined at paragraph [0083]. Basically MAD intensity denotes content complexity, and AD denotes the coding complexity since it is obtained from motion estimation module. Distortion intensity provides compensation for the coding artifact.

Then two indices, T1 and T2, are introduced to measure the relative intensity, as shown below $$T1 = MadIntensity/AdIntensity$$

$$T2 = MadIntensity/DistIntensity$$

Generally speaking, smaller T1 and T2 shall derive smaller Qp, resulting in better quality. The basic empirical observation is to assume that if T1 equals to 1, meaning that Ad and Mad both are in average level, Qp level should be kept at the Pic target Qp. If T1 is greater than 1, meaning the content of this MB is pretty busy (above average), but its coding complexity (AD) is below average, its QP will be increased due to its high complexity content. On the other hand, if T1 is smaller than 1, then Qp will be decreased due to its "easy", or flat content.

To further differentiate the content of a MB, a simple maximum and minimum operation can be used to select the larger value or smaller value, respectively.

```
If (MadIntensity <= 1.0) {
    T1 = MIN(T1, MadIntensity)
    T2 = MIN(T2, MadIntensity)
}
else {
    T1 = MAX(T1, MadIntensity)
    T2 = MAX(T2, MadIntensity)
}
```

For example, if two macro-blocks (M1, and M2) both have the same T1 (M1)=T1 (M2)=1.0, but MadIntensity(M1)=2.0 and MadIntensity(M2) 1.0. Then without this MIN and MAX operation, both will have the same T1 value. However, with this operation, T1(M1)=1.0, but T1(M2) becomes 2.0, resulting in higher Qp. This result is expected since any noise in higher content complexity is less sensitive to this vision system.

Finally, T1 and T2 are limited in +/−LocalAdjRange range, where LocalAdjRangew will be explained in section [00160].

$T1 = \text{limit}(1 - \text{Local}Adj\text{Range}, T1, 1 + \text{Local}Adj\text{Range});$ $T2 = \text{limit}(1 - \text{Local}Adj\text{Range}, T2, 1 + \text{Local}Adj\text{Range})$ Note that in the first I-frame(slice) and scene change I-frame(slice), the distortion information is not available before encoding a MB, then only T1 will be derived. Otherwise both T1 and T2 have to be calculated.

4.4 Adaptively Adjust Qp Range

Figure 7:
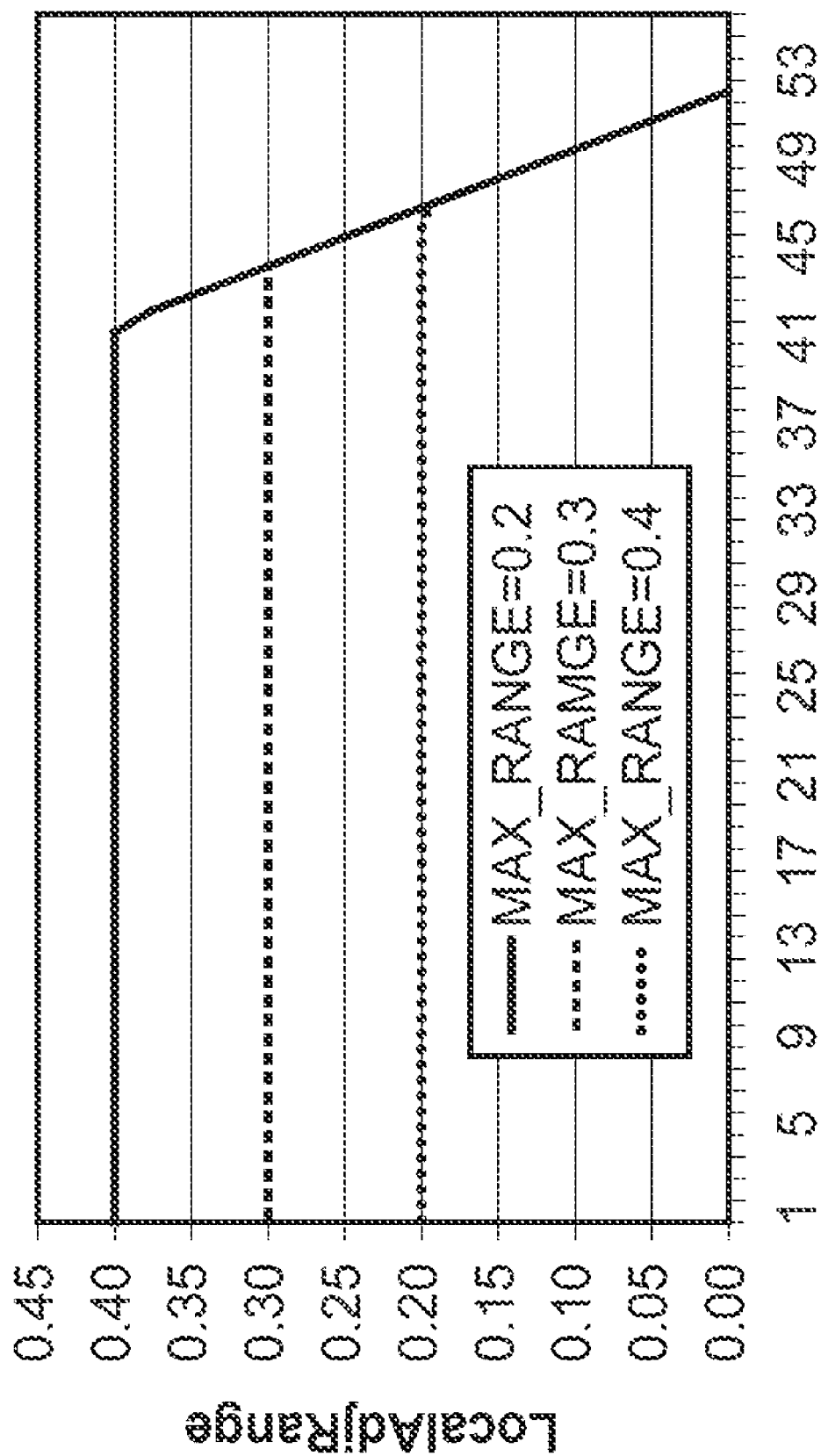
FIG. 7 is a graph showing the dynamic range distribution of QP as a function of picture syntax QP.

LocalAdjRange is calculated as follows:

$\text{MIN}((51 - \text{Syntax}Qp) * (\text{Syntax}Qp + 200)/6400.0, \text{MAX\_RANGE})$ where MAX_RANGE=0.3 in this implementation. This LocalAdjRange is controllable, depending on the scene content of a sequence. This value can be changed either in sequence base or in frame base. The larger its value, the broader the Qp dynamic range. If MAX_RANGE=0.0, then the Qp of the underlying picture level is used. LocalAdjRange also shows that in the higher Qp in picture level, the dynamic range of Qp is narrowed, and its distribution versus SyntaxQp is depicted in FIG. 7.

4.5 Adaptively Adjust Qp Step Size

After determining T1 and T2 in section [00150], the next step is to determine the Qp adjustment, LocalAdj. The formula is as follows:

$\text{Local}Adj = \text{limit}(1 - \text{Local}Adj\text{Range}, AD\_\text{WEIGHT} * T1 + (1 - AD\_\text{WEIGHT}) * T2, 1 + \text{Local}Adj\text{Range}),$ where LocalAdjRange is described in section [00160], and AD_WEIGHT is the fraction value in the range of 0.0 to 1.0. In our case, 0.5 is used to show that both T1 and T2 are equally important. LocalAdj is in the range of 1+/−LocalAdjRange. Smaller LocalAdj (i.e., <1.0) will have smaller Qp (i.e., <picture-level Qp).

Before going into the detailed discussion of "Adjust Qp Step size", we review the process of Qp calculation.

Step 1: $\text{Local}Adj = (\text{Local}Adj - 1.0) * \text{AdjustStepSize};$

Step 2: $\text{Local}Adj = Avg\text{Local}Adj;$

Step 3: $Qp = \text{PicEst}\text{Actual}Qp * (1 + \text{Local}Adj);$

Step 1 is to transform the LocalAdj from the range of (1+/−LocalAdjRange) to (+/−LocalAdjRange)*AdjustStepSize. That is, LocalAdj will increase (i.e., positive) or decrease (i.e., negative) the Qp value because of Step 3. Step 2 is performed to compensate the discrepancy between picture level target Qp, and MB level actual Qp in the previous frame (slice). Ideally the sum of LocalAdj for all MBs in a frame (slice) should be 0.0, so any leftover of sum of LocalAdj will be propagated to the next frame (slice) to ensure overall its approximation of picture-level Qp and bit rate.

Now let's discuss AdjustStepSize in step 1. This variable is to determine the granularity of adjustment step size. Its implementation is described below:

```
if (MbMad[iMbNum] < MbAvgMad) {
    MbQpGap = 200;
}
else if (MbMad[iMbNum] > MbAvgMad) {
    MbQpGap = 80;
}
else {
    MbQpGap = 130;
}
AdjustStepSize = (iMbQpGap-PicEstSyntaxQp)*0.01.
```

Note that this is just an example of calculation of AdjustStepSize. These numbers 200, 80 and 130 are empirical values, and can be modified according to different encoding environments. The basic idea of this method is to control the AdjustStepSize by changing the MbQpGap based on its content complexity. This implementation says that if the content of current MB, (i.e., MbMad[iMbNum]), is less than average complexity (MbAvgMad), then we can enlarge the MbQpGap value to significantly improve the perceptual quality in this smooth area. On the other hand, if it is larger than average complexity, a narrower MbQpGap is used to preserve the quality of this complex area. Flat areas show bigger MbQpGap values, resulting in significant improvement in visual quality, while in complex or busy areas, MbQpgap becomes small to preserve the quality to some degree. Those MBs with a negative value will be assigned smaller Qp and those MBs with positive values will be assigned bigger Qp for step 3.

4.6 Approximation of Picture Level Qp

In the MB algorithm of the present invention, there is no target bit information from picture level rate control. Instead, only the picture level target Qp is given to MB rate control. Therefore, to properly control the bit rate (to make both of them generate around the same bits in picture level and sequence level), the MB rate control is trying to get the average Qp, which is about the same value as PIC rate control. The way the MB rate control does this is to calculate the average Qp, and also calculate the average LocalAdj to realize that if the current local adjustment is too light or too overdosing, then the leftover part will be propagated to the next frame. For example, if the average LocalAdjust is −0.22, meaning that in this frame, most of the MBs will have smaller Qp than picture level Qp, then in the next frame, we have to compensate it by passing this information to the next frame. Thus, when MB rate control calculates the local adjust for the next frame, this leftover part will be taken into account in step 2 of section [00162].

5. Experimental Results

5.1 Target Bit Rate Coding

Tables 6 and 7 illustrate the performance of the macroblock rate control algorithm described above versus picture level rate control. Table 6 shows the performance of MB rate control, while Table 7 shows the performance of picture level rate control.

The first column in both tables shows the coding condition of a bitstream. It is specified as follows, for example, bicy_1000K_30F_G2_D31_Db1_ep0 where bicy: sequence name, 1000K: target bit rate is 1000Kbits per second, 30 F: target frame rate is 30 frames per second, G2: insert I-frame is every two seconds, D31: delay is 31 frames, Db1: deblocking filter is enabled, ep0: CAVLC entropy coding is used. The second column in both tables shows the dimension of the image and its scan mode: i denotes interlaced source video, and p denotes progressive source video. The third column (R) shows the actual bit rate. The third column (I-Qp) shows average Qp for I frames. The fourth column (P-Qp) shows the average Qp for P frames. The seventh to ninth columns show the average PSNR values.

In this experiment, MbRc was slightly worse in terms of PSNR value, but in terms of visual quality, it demonstrated a significantly superior visual quality due to its intensity based bit distribution. The basic idea is to lower Qp value to significantly improve the flat and smooth area, to which the human visual system is quite sensitive, while it increases Qp value in busy and complex areas (insensitive to the vision system) to improve the overall bit rate and quality.

become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1 iNumberOfMB = (iHSize/iYMBHSize) * (iVSize/iYMBVSize);
dBit rateForABlock = (m_pEnc->m_iBit rate)/(iNumberOfMB) dFrameRate

| bit rate | framerate | width | height | Bits per MB | Bits per pixel | Ratio | New MinQP |
|---|---|---|---|---|---|---|---|
| 10000 | 5 | 176 | 144 | 20.20 | 0.08 | 101.38 | 5 |
| 10000 | 7.5 | 176 | 144 | 13.47 | 0.05 | 152.06 | 6 |
| 10000 | 10 | 176 | 144 | 10.10 | 0.04 | 202.75 | 6 |
| 10000 | 15 | 176 | 144 | 6.73 | 0.03 | 304.13 | 8 |
| 10000 | 30 | 176 | 144 | 3.37 | 0.01 | 608.26 | 8 |
| 32000 | 10 | 176 | 144 | 32.32 | 0.13 | 63.36 | 4 |
| 32000 | 15 | 176 | 144 | 21.55 | 0.08 | 95.04 | 5 |
| 32000 | 30 | 176 | 144 | 10.77 | 0.04 | 190.08 | 6 |
| 64000 | 10 | 176 | 144 | 64.65 | 0.25 | 31.68 | 3 |
| 64000 | 15 | 176 | 144 | 43.10 | 0.17 | 47.52 | 3 |
| 64000 | 30 | 176 | 144 | 21.55 | 0.08 | 95.04 | 5 |
| 192000 | 10 | 352 | 288 | 48.48 | 0.19 | 42.24 | 3 |
| 192000 | 15 | 352 | 288 | 32.32 | 0.13 | 63.36 | 4 |
| 192000 | 30 | 352 | 288 | 16.16 | 0.06 | 126.72 | 6 |
| 256000 | 10 | 352 | 288 | 64.65 | 0.25 | 31.68 | 3 |
| 256000 | 15 | 352 | 288 | 43.10 | 0.17 | 47.52 | 3 |
| 256000 | 30 | 352 | 288 | 21.55 | 0.08 | 95.04 | 5 |
| 384000 | 10 | 352 | 288 | 96.97 | 0.38 | 21.12 | 1 |
| 384000 | 15 | 352 | 288 | 64.65 | 0.25 | 31.68 | 3 |
| 384000 | 30 | 352 | 288 | 32.32 | 0.13 | 63.36 | 4 |
| 1500000 | 30 | 1208 | 1152 | 9.20 | 0.04 | 222.66 | 8 |
| 2000000 | 30 | 1208 | 1152 | 12.26 | 0.05 | 166.99 | 6 |
| 4000000 | 30 | 1208 | 1152 | 24.53 | 0.10 | 83.50 | 5 |
| 6000000 | 30 | 1208 | 1152 | 36.79 | 0.14 | 55.66 | 4 |
| 8000000 | 30 | 1208 | 1152 | 49.06 | 0.19 | 41.75 | 3 |

5.2 Fix QP Coding

Table 8 shows all the frame coding information including Qp, Bits and PSNR for picture level rate control and MB level rate control in encoding a sample sequence using Qp=35. The last row summarizes the results that picture level rate control spends 50107 bits on average per frame, while the MB rate control of the present invention spends 42365 bits per frame and its average Qp=34.66. The PSNR value is around 1.0 db difference. But in terms of the visual quality, again the MB rate control shows around the same or better quality than picture level rate control.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may

TABLE 2

Positive part (I.e., buffer could be overflow)

| Prv QP | Tar QP | Dev* | 1 − Dev | Final QP | Prv QP | Tar QP | Dev* | 1 − Dev | Final QP |
|---|---|---|---|---|---|---|---|---|---|
| 28 | 8 | 0 | 1 | 18 | 3 | 8 | 0 | 1 | 8 |
| 28 | 8 | 0.1 | 0.9 | 18 | 3 | 8 | 0.1 | 0.9 | 7.05 |
| 28 | 8 | 0.2 | 0.8 | 18 | 3 | 8 | 0.2 | 0.8 | 6.2 |
| 28 | 8 | 0.3 | 0.7 | 17.8 | 3 | 8 | 0.3 | 0.7 | 5.45 |
| 28 | 8 | 0.4 | 0.6 | 15.2 | 3 | 8 | 0.4 | 0.6 | 4.8 |
| 28 | 8 | 0.5 | 0.5 | 13 | 3 | 8 | 0.5 | 0.5 | 4.25 |
| 28 | 8 | 0.6 | 0.4 | 11.2 | 3 | 8 | 0.6 | 0.4 | 3.8 |
| 28 | 8 | 0.7 | 0.3 | 9.8 | 3 | 8 | 0.7 | 0.3 | 3.45 |
| 28 | 8 | 0.8 | 0.2 | 8.8 | 3 | 8 | 0.8 | 0.2 | 3.2 |
| 28 | 8 | 0.9 | 0.1 | 8.2 | 3 | 8 | 0.9 | 0.1 | 3.05 |
| 28 | 8 | 1 | 0 | 8 | 3 | 8 | 1 | 0 | 3 |

TABLE 3

| Prv QP | Tar QP | Dev** | Final QP | Prv QP | Cur QP | Dev** | Final QP |
|---|---|---|---|---|---|---|---|
| 28 | 8 | 0 | 8 | 3 | 8 | 0 | 3 |
| 28 | 8 | 0.1 | 8.2 | 3 | 8 | 0.1 | 3.05 |
| 28 | 8 | 0.2 | 8.8 | 3 | 8 | 0.2 | 3.2 |
| 28 | 8 | 0.3 | 9.8 | 3 | 8 | 0.3 | 3.45 |
| 28 | 8 | 0.4 | 11.2 | 3 | 8 | 0.4 | 3.8 |
| 28 | 8 | 0.5 | 13 | 3 | 8 | 0.5 | 4.25 |
| 28 | 8 | 0.6 | 15.2 | 3 | 8 | 0.6 | 4.8 |
| 28 | 8 | 0.7 | 17.8 | 3 | 8 | 0.7 | 5.45 |
| 28 | 8 | 0.8 | 20.8 | 3 | 8 | 0.8 | 6.2 |
| 28 | 8 | 0.9 | 24.2 | 3 | 8 | 0.9 | 7.05 |
| 28 | 8 | 1 | 28 | 3 | 8 | 1 | 8 |

TABLE 4

| SD | Bit rate | MAD per pixel | AD per pixel | MAD/AD |
|---|---|---|---|---|
| bicycle | 1000K | 12.67 | 9.64 | 1.31 |
| Bus | 1000K | 13.23 | 9.27 | 1.43 |
| Car | 1000K | 11.28 | 8.21 | 1.37 |
| cheer | 1000K | 12.53 | 8.68 | 1.44 |
| confe | 1000K | 10.74 | 7.19 | 1.49 |
| football | 1000K | 8.70 | 6.32 | 1.38 |
| flower | 1000K | 14.84 | 11.32 | 1.31 |
| marble | 1000K | 12.41 | 4.42 | 2.81 |
| mobile | 1000K | 17.39 | 13.35 | 1.30 |
| Pop | 1000K | 8.57 | 6.75 | 1.27 |
| tennis | 1000K | 15.73 | 14.51 | 1.08 |
| Face | 1000K | 2.82 | 0.79 | 3.57 |
|  | 1000K | 3.24 | 1.75 | 1.85 |
|  | 1000K | 3.54 | 2.22 | 1.59 |
| Wall | 1000K | 1.69 | 1.02 | 1.66 |
|  | 1000K | 3.03 | 1.59 | 1.91 |
|  | 1000K | 2.03 | 1.38 | 1.47 |
| battle | 1000K | 2.77 | 2.23 | 1.24 |
|  | 1000K | 3.77 | 3.74 | 1.01 |
|  | 1000K | 5.45 | 3.99 | 1.37 |
| AVERAGE |  | 8.32 | 5.92 | 1.59 |

TABLE 5

| SIF/CIF | Bit rate | MAD per pixel | AD per pixel | MAD/AD |
|---|---|---|---|---|
| bicycle | 384K | 12.38 | 9.20 | 1.35 |
| cheer | 384K | 15.07 | 11.82 | 1.27 |
| child | 384K | 9.04 | 5.60 | 1.61 |
| foreman | 384K | 6.68 | 3.50 | 1.91 |
| fountain | 384K | 14.21 | 11.98 | 1.19 |
| mino | 384K | 8.76 | 4.98 | 1.76 |
| mobile | 384K | 18.76 | 13.94 | 1.35 |
| new2 | 384K | 7.70 | 4.84 | 1.59 |
| papa | 384K | 3.79 | 2.57 | 1.47 |
| AVERAGE |  | 10.71 | 7.60 | 1.50 |

TABLE 6

| Bistream (MB) | Dimension | Bit rate | I-Qp | P-Qp | PSNR-Y | PSNY-Cb | PSNR-Cr |
|---|---|---|---|---|---|---|---|
| bicy__1000 K__30F__G2__D31__Db1__ep0 | 720 × 480i | 1040.0 K | 42.28 | 43.00 | 23.24 | 33.75 | 32.76 |
| bus__1000 K__30F__G2__D31__Db1__ep0 | 720 × 480i | 953.4 K | 38.65 | 39.26 | 25.66 | 37.40 | 35.60 |
| cheer__1000 K__30F__G2__D31__Db1__ep0 | 720 × 480i | 1053.7 K | 43.77 | 45.17 | 21.90 | 30.17 | 29.27 |
| child__384 K__30F__G2__D31__Db1__ep0 | 352 × 288p | 379.1 K | 32.43 | 33.67 | 31.62 | 33.93 | 33.63 |
| flower__1000 K__30F__G2__D31__Db1__ep0 | 720 × 480i | 985.5 K | 39.44 | 40.54 | 22.91 | 32.18 | 30.92 |
| foreman__384 K__30F__G2__D31__Db1__ep0 | 352 × 288p | 385.9 K | 28.32 | 29.72 | 33.92 | 41.20 | 39.67 |
| foundtain__1000 K__30F__G2__D31__Db1__ep0 | 320 × 240p | 1184.1 K | 32.76 | 35.54 | 26.47 | 44.12 | 43.35 |
| mino__384 K__30F__G2__D31__Db1__ep0 | 320 × 240p | 342.2 K | 26.60 | 27.85 | 35.17 | 38.88 | 37.08 |
| news2__384 K__30F__G2__D31__Db1__ep0 | 320 × 240p | 418.8 K | 28.30 | 30.29 | 34.26 | 39.24 | 37.74 |
| papa__384 K__30F__G2__D31__Db1__ep0 | 320 × 240p | 380.8 K | 22.87 | 23.63 | 39.76 | 44.02 | 42.87 |
| pop__1000 K__30F__G2__D31__Db1__ep0 | 720 × 480i | 1168.4 K | 37.40 | 38.86 | 27.55 | 32.52 | 32.07 |
| sasam__384 K__30F__G2__D31__Db1__ep0 | 320 × 240p | 370.4 K | 25.63 | 26.35 | 36.60 | 43.09 | 43.13 |

TABLE 7

| Bistream (PIC) | Dimension | Bit rate | I-Qp | P-Qp | PSNR-Y | PSNY-Cb | PSNR-Cr |
|---|---|---|---|---|---|---|---|
| bicy__1000K__30F__G2__D31__Db1__ep0 | 720 × 480i | 1047.7 K | 43.67 | 43.48 | 23.63 | 33.69 | 32.69 |
| bus__1000K__30F__G2__D31__Db1__ep0 | 720 × 480i | 968.6 K | 41.00 | 40.32 | 25.76 | 37.25 | 35.51 |
| cheer__1000K__30F__G2__D31__Db1__ep0 | 720 × 480i | 1045.7 K | 45.00 | 45.24 | 22.33 | 30.10 | 29.25 |
| child__384K__30F__G2__D31__Db1__ep0 | 352 × 288p | 382.7 K | 34.80 | 34.88 | 31.56 | 33.58 | 33.22 |
| flower__1000K__30F__G2__D31__Db1__ep0 | 720 × 480i | 996.3 K | 41.67 | 41.65 | 23.04 | 32.14 | 30.93 |
| foreman__384K__30F__G2__D31__Db1__ep0 | 352 × 288p | 389.3 K | 30.00 | 30.34 | 34.31 | 41.35 | 39.88 |
| foundtain__1000K__30F__G2__D31__Db1__ep0 | 320 × 240p | 1149.5 K | 35.67 | 37.75 | 26.42 | 43.13 | 42.77 |
| mino__384K__30F__G2__D31__Db1__ep0 | 320 × 240p | 341.7 K | 28.17 | 28.27 | 35.61 | 38.95 | 37.21 |
| news2__384K__30F__G2__D31__Db1__ep0 | 320 × 240p | 418.4 K | 29.71 | 30.86 | 34.72 | 39.35 | 37.83 |
| papa__384K__30F__G2__D31__Db1__ep0 | 320 × 240p | 396.1 K | 24.33 | 24.27 | 40.32 | 44.36 | 43.16 |
| pop__1000K__30F__G2__D31__Db1__ep0 | 720 × 480i | 1174.5 K | 40.33 | 40.51 | 27.77 | 32.19 | 31.81 |
| sasam__384K__30F__G2__D31__Db1__ep0 | 320 × 240p | 372.1 K | 27.44 | 27.55 | 37.02 | 43.13 | 43.09 |

TABLE 8

| Frame No. | Type: | PIC Rate Control | | | MB Rate Control | | |
|---|---|---|---|---|---|---|---|
| | | PIC-QP | BITS | PSNR-Y | Avg-QP | BITS | PSNR-Y |
| 0 | I: | 35 | 72064 | 29.76 | 31.8 | 86728 | 30.75 |
| 1 | P: | 35 | 48128 | 28.26 | 34.9 | 39224 | 26.94 |
| 2 | P: | 35 | 54808 | 27.95 | 34.5 | 50200 | 27.24 |
| 3 | P: | 35 | 52120 | 28.04 | 34.7 | 43592 | 26.77 |
| 4 | P: | 35 | 54504 | 27.94 | 34.8 | 44464 | 26.53 |
| 5 | P: | 35 | 49088 | 28.18 | 34.8 | 41696 | 26.91 |
| 6 | P: | 35 | 48160 | 28.3 | 34.7 | 40232 | 26.95 |
| 7 | P: | 35 | 47560 | 28.37 | 34.7 | 40168 | 27.01 |
| 8 | P: | 35 | 48304 | 28.26 | 34.8 | 40336 | 26.84 |
| 9 | P: | 35 | 54048 | 27.97 | 34.8 | 45496 | 26.54 |
| 10 | P: | 35 | 48448 | 28.32 | 34.8 | 40104 | 26.88 |
| 11 | P: | 35 | 51904 | 28.06 | 34.8 | 42776 | 26.72 |
| 12 | P: | 35 | 50440 | 28.14 | 34.8 | 41512 | 26.68 |
| 13 | P: | 35 | 51600 | 28.07 | 34.7 | 43336 | 26.73 |
| 14 | P: | 35 | 50520 | 28.09 | 34.7 | 43264 | 26.77 |
| 15 | P: | 35 | 55576 | 27.99 | 34.7 | 47384 | 26.65 |
| 16 | P: | 35 | 54600 | 27.99 | 34.7 | 46464 | 26.62 |
| 17 | P: | 35 | 54080 | 28.03 | 34.8 | 44632 | 26.55 |
| 18 | P: | 35 | 51080 | 28.27 | 34.6 | 45528 | 27.38 |
| 19 | P: | 35 | 55472 | 28.06 | 34.4 | 49216 | 27.18 |
| 20 | P: | 35 | 54216 | 28.11 | 34.7 | 45600 | 26.65 |
| 21 | P: | 35 | 48784 | 28.37 | 34.8 | 40344 | 26.87 |
| 22 | P: | 35 | 54816 | 28.04 | 34.7 | 46272 | 26.62 |
| 23 | P: | 35 | 53664 | 28.17 | 34.7 | 44336 | 26.72 |
| 24 | P: | 35 | 50288 | 28.24 | 34.7 | 41840 | 26.79 |
| 25 | P: | 35 | 51480 | 28.18 | 34.6 | 43432 | 26.82 |
| 26 | P: | 35 | 49640 | 28.32 | 34.8 | 39184 | 26.83 |
| 27 | P: | 35 | 52608 | 28.12 | 34.6 | 44552 | 26.79 |
| 28 | P: | 35 | 53488 | 28.03 | 34.7 | 43968 | 26.59 |
| 29 | P: | 35 | 52712 | 28.07 | 34.7 | 43584 | 26.6 |
| 30 | P: | 35 | 48344 | 28.37 | 34.8 | 39024 | 26.89 |
| 31 | P: | 35 | 52712 | 28.09 | 34.7 | 43872 | 26.66 |
| 32 | P: | 35 | 54064 | 28.06 | 34.7 | 45344 | 26.61 |
| 33 | P: | 35 | 55904 | 27.95 | 34.7 | 46824 | 26.49 |
| 34 | P: | 35 | 55456 | 27.95 | 34.7 | 45744 | 26.52 |
| 35 | P: | 35 | 52984 | 28.17 | 34.6 | 44720 | 26.84 |
| 36 | P: | 35 | 55648 | 28 | 34.7 | 47792 | 26.66 |
| 37 | P: | 35 | 53176 | 28.13 | 34.8 | 43496 | 26.71 |
| 38 | P: | 35 | 48792 | 28.29 | 34.6 | 44072 | 27.54 |
| 39 | P: | 35 | 50712 | 28.2 | 34.4 | 45744 | 27.46 |
| 40 | P: | 35 | 49800 | 28.23 | 34.7 | 40728 | 26.84 |
| 41 | P: | 35 | 48720 | 28.23 | 34.8 | 40656 | 26.87 |
| 42 | P: | 35 | 52520 | 28.13 | 34.9 | 43376 | 26.63 |
| 43 | P: | 35 | 51504 | 28.16 | 34.6 | 46296 | 27.33 |
| 44 | P: | 35 | 52064 | 28.06 | 34.3 | 48688 | 27.32 |
| 45 | P: | 35 | 54720 | 27.99 | 34.8 | 45368 | 26.51 |
| 46 | P: | 35 | 56408 | 27.9 | 34.8 | 46288 | 26.44 |
| 47 | P: | 35 | 53488 | 28.09 | 34.7 | 43672 | 26.59 |
| 48 | P: | 35 | 51472 | 28.17 | 34.9 | 41136 | 26.64 |
| 49 | P: | 35 | 49984 | 28.2 | 34.5 | 45064 | 27.35 |
| 50 | P: | 35 | 57336 | 27.87 | 34.4 | 51760 | 27.08 |
| 51 | P: | 35 | 52688 | 28.04 | 34.8 | 43128 | 26.58 |
| 52 | P: | 35 | 55448 | 27.91 | 34.4 | 51328 | 27.16 |
| 53 | P: | 35 | 52560 | 28.05 | 34.7 | 44488 | 26.75 |
| 54 | P: | 35 | 50528 | 28.15 | 34.8 | 40880 | 26.71 |
| 55 | P: | 35 | 50672 | 28.11 | 34.8 | 42256 | 26.69 |
| 56 | P: | 35 | 51600 | 28.03 | 34.8 | 43112 | 26.68 |
| 57 | P: | 35 | 49392 | 28.27 | 34.7 | 40600 | 26.91 |
| 58 | P: | 35 | 50904 | 28.1 | 34.7 | 42208 | 26.73 |
| 59 | P: | 35 | 49520 | 28.25 | 34.7 | 41776 | 26.87 |
| 60 | I: | 35 | 69640 | 29.95 | 34.2 | 67336 | 29.36 |
| 61 | P: | 35 | 47624 | 28.43 | 34.7 | 38512 | 27.03 |
| 62 | P: | 35 | 55176 | 28.08 | 34.7 | 45880 | 26.66 |
| 63 | P: | 35 | 54592 | 27.94 | 34.8 | 45736 | 26.51 |
| 64 | P: | 35 | 54648 | 28.06 | 34.7 | 45520 | 26.62 |
| 65 | P: | 35 | 47424 | 28.31 | 34.7 | 40544 | 26.98 |
| 66 | P: | 35 | 51808 | 28.13 | 34.7 | 43704 | 26.73 |
| 67 | P: | 35 | 48824 | 28.34 | 34.7 | 40432 | 26.92 |
| 68 | P: | 35 | 47304 | 28.37 | 34.7 | 39488 | 27.04 |
| 69 | P: | 35 | 50104 | 28.17 | 34.7 | 41720 | 26.84 |
| 70 | P: | 35 | 52432 | 28.06 | 34.6 | 44232 | 26.79 |
| 71 | P: | 35 | 51136 | 28.16 | 34.6 | 42792 | 26.86 |
| 72 | P: | 35 | 47264 | 28.37 | 34.7 | 38992 | 27.04 |
| 73 | P: | 35 | 53824 | 27.99 | 34.7 | 45016 | 26.64 |
| 74 | P: | 35 | 48848 | 28.21 | 34.7 | 40096 | 26.85 |
| 75 | P: | 35 | 48584 | 28.17 | 34.7 | 40512 | 26.84 |
| 76 | P: | 35 | 46728 | 28.32 | 34.6 | 38592 | 27.01 |
| 77 | P: | 35 | 44840 | 28.35 | 34.8 | 37120 | 26.97 |
| 78 | P: | 35 | 48944 | 28.23 | 34.6 | 40856 | 26.89 |
| 79 | P: | 35 | 53432 | 28.03 | 34.6 | 44832 | 26.69 |
| 80 | P: | 35 | 48312 | 28.26 | 34.7 | 39584 | 26.87 |
| 81 | P: | 35 | 46616 | 28.4 | 34.7 | 38376 | 27.01 |
| 82 | P: | 35 | 50600 | 28.12 | 34.6 | 43272 | 26.89 |
| 83 | P: | 35 | 50024 | 28.21 | 34.7 | 40512 | 26.85 |
| 84 | P: | 35 | 47392 | 28.5 | 34.7 | 39512 | 27.11 |
| 85 | P: | 35 | 46360 | 28.49 | 34.7 | 38720 | 27.05 |
| 86 | P: | 35 | 48352 | 28.36 | 34.6 | 41544 | 27.02 |
| 87 | P: | 35 | 50528 | 28.24 | 34.6 | 42424 | 26.89 |
| 88 | P: | 35 | 46136 | 28.6 | 34.7 | 38520 | 27.22 |
| 89 | P: | 35 | 49152 | 28.26 | 34.7 | 41144 | 26.85 |
| 90 | P: | 35 | 46312 | 28.33 | 34.7 | 39008 | 27.04 |
| 91 | P: | 35 | 49544 | 28.2 | 34.6 | 41520 | 26.86 |
| 92 | P: | 35 | 47512 | 28.33 | 34.8 | 39152 | 27.02 |
| 93 | P: | 35 | 48984 | 28.24 | 34.4 | 45104 | 27.56 |
| 94 | P: | 35 | 44432 | 28.35 | 34.8 | 36384 | 27.07 |
| 95 | P: | 35 | 44448 | 28.39 | 34.8 | 36064 | 27.05 |
| 96 | P: | 35 | 49808 | 28.12 | 34.5 | 45320 | 27.37 |
| 97 | P: | 35 | 45480 | 28.29 | 34.9 | 37072 | 26.92 |
| 98 | P: | 35 | 45288 | 28.31 | 34.3 | 42568 | 27.65 |
| 99 | P: | 35 | 44216 | 28.41 | 34.8 | 36320 | 27.07 |
| 100 | P: | 35 | 45608 | 28.39 | 34.7 | 37176 | 27.07 |
| 101 | P: | 35 | 42000 | 28.53 | 34.8 | 34632 | 27.26 |
| 102 | P: | 35 | 43696 | 28.47 | 34.7 | 36056 | 27.2 |
| 103 | P: | 35 | 43576 | 28.48 | 34.8 | 35744 | 27.19 |
| 104 | P: | 35 | 46728 | 28.26 | 34.6 | 40728 | 27.04 |
| 105 | P: | 35 | 51568 | 28.13 | 34.8 | 42872 | 26.77 |
| 106 | P: | 35 | 48768 | 28.26 | 34.8 | 40656 | 26.96 |
| 107 | P: | 35 | 45248 | 28.39 | 34.8 | 36872 | 27 |
| 108 | P: | 35 | 50632 | 28.12 | 34.7 | 41840 | 26.76 |
| 109 | P: | 35 | 49232 | 28.2 | 34.7 | 41168 | 26.79 |
| 110 | P: | 35 | 44400 | 28.44 | 34.8 | 36200 | 27.07 |
| 111 | P: | 35 | 50552 | 28.05 | 34.6 | 43536 | 26.86 |
| 112 | P: | 35 | 47656 | 28.25 | 34.8 | 38744 | 27.01 |
| 113 | P: | 35 | 49376 | 28.23 | 34.5 | 42288 | 26.97 |
| 114 | P: | 35 | 50128 | 28.17 | 34.7 | 41208 | 26.82 |
| 115 | P: | 35 | 44864 | 28.43 | 34.7 | 36608 | 27.07 |
| 116 | P: | 35 | 44624 | 28.37 | 34.7 | 37024 | 27.02 |
| 117 | P: | 35 | 50968 | 28.19 | 34.7 | 41720 | 26.76 |
| 118 | P: | 35 | 49560 | 28.23 | 34.6 | 40960 | 26.93 |
| 119 | P: | 35 | 51400 | 28.11 | 34.7 | 42248 | 26.83 |
| 120 | I: | 35 | 68456 | 30.07 | 34.3 | 65816 | 29.38 |
| 121 | P: | 35 | 42520 | 28.66 | 34.7 | 34600 | 27.38 |
| 122 | P: | 35 | 45120 | 28.47 | 34.7 | 37208 | 27.12 |
| 123 | P: | 35 | 47280 | 28.34 | 34.6 | 39600 | 27.01 |
| 124 | P: | 35 | 47888 | 28.36 | 34.7 | 39208 | 26.95 |
| 125 | P: | 35 | 47648 | 28.43 | 34.8 | 38336 | 27 |
| 126 | P: | 35 | 43072 | 28.65 | 34.6 | 35672 | 27.3 |
| 127 | P: | 35 | 47944 | 28.35 | 34.6 | 40112 | 27.01 |
| 128 | P: | 35 | 45344 | 28.6 | 34.8 | 36200 | 27.12 |
| 129 | P: | 35 | 48384 | 28.37 | 34.5 | 41016 | 27.08 |
| 130 | P: | 35 | 45896 | 28.54 | 34.9 | 37816 | 27.09 |
| 131 | P: | 35 | 46952 | 28.39 | 34.8 | 38680 | 26.93 |
| 132 | P: | 35 | 43392 | 28.58 | 34.8 | 36432 | 27.2 |
| 133 | P: | 35 | 46656 | 28.35 | 34.6 | 38864 | 27.06 |
| 134 | P: | 35 | 48008 | 28.37 | 34.6 | 39216 | 26.97 |
| 135 | P: | 35 | 45600 | 28.46 | 34.8 | 36720 | 27.03 |
| 136 | P: | 35 | 52144 | 28.19 | 34.8 | 41680 | 26.75 |
| 137 | P: | 35 | 46648 | 28.44 | 34.8 | 37720 | 27.04 |
| 138 | P: | 35 | 46080 | 28.47 | 34.5 | 41136 | 27.67 |
| 139 | P: | 35 | 47568 | 28.36 | 34.3 | 42888 | 27.63 |
| 140 | P: | 35 | 50472 | 28.29 | 34.7 | 41416 | 26.79 |
| 141 | P: | 35 | 48800 | 28.31 | 34.6 | 41120 | 26.91 |
| 142 | P: | 35 | 53080 | 28.05 | 34.6 | 44920 | 26.71 |
| 143 | P: | 35 | 48016 | 28.41 | 34.9 | 40360 | 26.85 |
| 144 | P: | 35 | 47304 | 28.33 | 34.3 | 43240 | 27.62 |
| 145 | P: | 35 | 46072 | 28.44 | 34.9 | 37848 | 27.09 |
| 146 | P: | 35 | 47104 | 28.37 | 34.4 | 43440 | 27.71 |
| 147 | P: | 35 | 52144 | 28.1 | 34.6 | 43448 | 26.86 |

TABLE 8-continued

| Frame No. | Type: | PIC Rate Control | | | MB Rate Control | | |
|---|---|---|---|---|---|---|---|
| | | PIC-QP | BITS | PSNR-Y | Avg-QP | BITS | PSNR-Y |
| 148 | P: | 35 | 52976 | 28.13 | 34.9 | 42920 | 26.64 |
| 149 | P: | 35 | 50848 | 28.22 | 34.5 | 45952 | 27.4 |
| | | 35 | 50107 | 28.26 | 34.66 | 42365 | 26.99 |

What is claimed is:

1. A method of deriving a quantization parameter for macroblocks and pictures during rate control within a video encoder, comprising:
calculating at least one complexity intensity value for a macroblock in response to dividing a current value of complexity for the macroblock by an average value of complexity for a frame associated with the macroblock;
calculating at least one distortion intensity value for the macroblock in response to dividing a current value of distortion for the macroblock by an average value of distortion for a frame associated with the macroblock; and
generating a quantization parameter in response to a comparison between said at least one complexity intensity value and said at least one distortion intensity value.

2. A method as recited in claim 1, wherein said calculating of at least one complexity intensity value comprises calculating absolute difference intensity and/or calculating mean absolute difference intensity.

3. A method as recited in claim 1, further comprising adding an intensity base value to the complexity intensity and/or distortion intensity, and adding an intensity base value to the average value of complexity intensity and/or distortion intensity, prior to said dividing.

4. A method as recited in claim 3, wherein said intensity base value comprises a predetermined portion of an average mean absolute difference intensity.

5. A method as recited in claim 3, wherein said intensity base value comprises average mean absolute difference intensity divided by a constant.

6. A method as recited in claim 5, wherein said mean absolute difference intensity is determined for each macroblock in response to $$(\text{int})\left(\left(\sum_{i=0}^{i=n}\sum_{j=0}^{j=m}|X_{i,j}-\overline{X}_i|\right)/\text{CONST}\right)$$

where $X_{i,j}$ denotes the pixel value at position j at block i, $\overline{X}_i$ denotes the mean value of the block i, n represents the number of blocks, and m represents the number of pixels, while CONST is a constant.

7. A method as recited in claim 1, wherein said generating of a quantization parameter is performed in response to a comparison between two complexity intensity values and one distortion intensity value.

8. A method as recited in claim 1, further comprising:
determining a first index value in response to a relationship between two complexity intensity values within said at least one complexity intensity value;
determining a second index value in response to the relationship between one complexity intensity value and one distortion intensity value;
limiting each said index value to a local adjust range; and
determining granularity of said quantization parameter in response to a relationship between said first and second index values.

9. A method of deriving a quantization parameter for macroblocks and pictures during rate control within a video encoder, comprising:
calculating at least a first and second intensity value for a macroblock in response to a current value of complexity with respect to an average value of complexity;
calculating at least a third intensity value for a macroblock in response to a current value of distortion with respect to an average value of distortion; and
generating a quantization parameter in response to a comparison of at least said first, second, and third intensity values;
wherein said first and second intensity values comprise a mean absolute difference intensity, and an absolute-difference intensity, respectively; and
wherein said mean absolute difference intensity is determined in response to summing a current value of mean absolute difference intensity for the macroblock with an intensity base value, and dividing by a sum of average mean absolute difference for the macroblock and said intensity base value.

10. A method of deriving a quantization parameter for macroblocks and pictures during rate control within a video encoder, comprising:
calculating at least a first and second intensity value for a macroblock in response to a current value of complexity with respect to an average value of complexity;
calculating at least a third intensity value for a macroblock in response to a current value of distortion with respect to an average value of distortion; and
generating a quantization parameter in response to a comparison of at least said first, second, and third intensity values;
wherein said first and second intensity values comprise a mean absolute difference intensity, and an absolute-difference intensity, respectively; and
wherein said absolute difference intensity is determined in response to summing a current value of absolute difference intensity for the macroblock with an intensity base value, and dividing by a sum of average absolute difference for the macroblock and an intensity base value.

11. A method of deriving a quantization parameter for macroblocks and pictures during rate control within a video encoder, comprising:
calculating at least a first and second intensity value for a macroblock in response to a current value of complexity with respect to an average value of complexity;
calculating at least a third intensity value for a macroblock in response to a current value of distortion with respect to an average value of distortion; and
generating a quantization parameter in response to a comparison of at least said first, second, and third intensity values;
wherein said third intensity value comprises a distortion intensity determined in response to summing a current value of distortion intensity for the macroblock with an intensity base value, and dividing by a sum of average distortion for the macroblock and said intensity base value.

12. The method as recited in claim 11, wherein said intensity base value comprises a desired fraction of an average complexity value.

13. A method as recited in claim 12, wherein said average complexity value is determined in response to a mean absolute difference intensity averaged over a frame and divided by a desired constant.

14. A method as recited in claim 13, wherein said mean absolute difference is determined for each macroblock in response to $$\text{(int)}\left(\left(\sum_{i=0}^{i=n}\sum_{j=0}^{j=m}|X_{i,j}-\overline{X}_i|\right)\Big/\text{CONST}\right)$$

where $X_{i,j}$ denotes the pixel value at position j at block i, $\overline{X}_i$ denotes the mean value of the block i, n represents the number of blocks, and m represents the number of pixels, while CONST is a constant.

* * * * *